(12) United States Patent
Inoue

(10) Patent No.: US 12,067,822 B2
(45) Date of Patent: Aug. 20, 2024

(54) GATE DEVICE, AUTHENTICATION SYSTEM, GATE DEVICE CONTROL METHOD, AND STORAGE MEDIUM

(71) Applicant: NEC Corporation, Tokyo (JP)

(72) Inventor: Junichi Inoue, Tokyo (JP)

(73) Assignee: NEC CORPORATION, Tokyo (JP)

( * ) Notice: Subject to any disclaimer, the term of this patent is extended or adjusted under 35 U.S.C. 154(b) by 71 days.

(21) Appl. No.: 17/801,664

(22) PCT Filed: Mar. 18, 2020

(86) PCT No.: PCT/JP2020/012044
§ 371 (c)(1),
(2) Date: Aug. 23, 2022

(87) PCT Pub. No.: WO2021/186627
PCT Pub. Date: Sep. 23, 2021

(65) Prior Publication Data
US 2023/0126015 A1   Apr. 27, 2023

(51) Int. Cl.
*G07C 9/15*  (2020.01)
*G06V 20/52*  (2022.01)
(Continued)

(52) U.S. Cl.
CPC ............... *G07C 9/15* (2020.01); *G06V 20/53* (2022.01); *G06V 40/171* (2022.01);
(Continued)

(58) Field of Classification Search
CPC ... G07C 9/15; G07C 9/37; G07C 9/38; G06V 20/53; G06V 40/171; G06V 40/172; G06V 2201/07
See application file for complete search history.

(56) References Cited

U.S. PATENT DOCUMENTS

| 7,693,308 | B2 * | 4/2010 | Ono | G06V 10/141 |
| | | | | 340/5.2 |
| 2006/0204050 | A1 * | 9/2006 | Takizawa | G06V 40/67 |
| | | | | 382/115 |

(Continued)

FOREIGN PATENT DOCUMENTS

| EP | 1696393 A2 | 8/2006 |
| EP | 1868158 A2 | 12/2007 |

(Continued)

OTHER PUBLICATIONS

JP Office Action for JP Application No. 2022-508712, mailed on Jun. 20, 2023 with English Translation.

(Continued)

*Primary Examiner* — Mohamed Barakat

(57) ABSTRACT

Provided is a gate device that accurately determines a user who is an authentication target. This gate device is provided with an acquisition unit, a setting unit, and a gate control unit. The acquisition unit acquires an image from a camera. When a plurality of users are included in the acquired image, the setting unit specifies a user on the front row among the plurality of users in accordance with the respective positions of the plurality of users in the image, and sets the specified user as an authentication target person. The gate control unit controls a gate on the basis of a authentication result of the authentication target person.

10 Claims, 22 Drawing Sheets

(51) Int. Cl.
*G06V 40/16* (2022.01)
*G07C 9/37* (2020.01)
*G07C 9/38* (2020.01)

(52) U.S. Cl.
CPC ............ *G06V 40/172* (2022.01); *G07C 9/37* (2020.01); *G07C 9/38* (2020.01); *G06V 2201/07* (2022.01)

(56) References Cited

U.S. PATENT DOCUMENTS

| | | | |
|---|---|---|---|
| 2015/0086074 A1* | 3/2015 | Kasahara | G06F 3/011 382/103 |
| 2019/0272691 A1* | 9/2019 | Nye | G07C 9/38 |
| 2020/0202110 A1 | 6/2020 | Kochi et al. | |
| 2021/0110625 A1* | 4/2021 | Kawase | G07C 9/25 |

FOREIGN PATENT DOCUMENTS

| | | | | | |
|---|---|---|---|---|---|
| JP | 2006-236244 A | | 9/2006 | | |
| JP | 2007-249298 A | | 9/2007 | | |
| JP | 2015-168985 A | | 9/2015 | | |
| JP | 2018-109935 A | | 7/2018 | | |
| JP | 2018-128970 A | | 8/2018 | | |
| JP | 6409929 B1 | * | 10/2018 | ......... | G06K 9/00248 |
| JP | 2019-053675 A | | 4/2019 | | |
| JP | 2019-194875 A | | 11/2019 | | |
| JP | 2020-038545 A | | 3/2020 | | |
| JP | 2020038545 A | * | 3/2020 | | |
| WO | 2018/181968 A1 | | 10/2018 | | |

OTHER PUBLICATIONS

Extended European Search Report for EP Application No. 20926128.8, dated on Mar. 28, 2023.
International Search Report for PCT Application No. PCT/JP2020/012044, mailed on Jun. 9, 2020.
2 English translation of Written opinion for PCT Application No. PCT/JP2020/012044, mailed on Jun. 9, 2020.

* cited by examiner

Fig. 18

| USER ID | FEATURE AMOUNT | NAME | GENDER | ... |
|---|---|---|---|---|
| ID01 | FV1 | AAA | MALE | ... |
| ID02 | FV2 | BBB | FEMALE | ... |
| ID03 | FV3 | CCC | MALE | ... |
| ... | ... | ... | ... | ... |

USER DATABASE

GATE DEVICE, AUTHENTICATION SYSTEM, GATE DEVICE CONTROL METHOD, AND STORAGE MEDIUM

This application is a National Stage Entry of PCT/JP2020/012044 filed on Mar. 18, 2020, the contents of all of which are incorporated herein by reference, in their entirety.

TECHNICAL FIELD

The present disclosure relates to a gate device, an authentication system, a gate device control method, and a storage medium.

BACKGROUND ART

Services using face authentication have started to spread (see PTLs 1 to 3). For example, face authentication has started to be applied to various procedures (for example, check-in, baggage check, security check, and the like) at airports. A service using face authentication is often provided using a gate device.

CITATION LIST

Patent Literature

[PTL 1] JP 2006-236244 A
[PTL 2] JP 2018-128970 A
[PTL 3] JP 2018-109935 A

SUMMARY

Technical Problem

As described above, services using face authentication have started to be provided at airports and the like. For example, a security check using face authentication is performed at a security check site at an airport. Here, the device installation space of the existing airport is limited, and the gate device for face authentication is often installed in a narrow space.

Therefore, when the gate device acquires the image (the image including the face area), the image may include not only the face image of the user in the foremost row (the user of the authentication target) but also the face image of the user behind. That is, since the gate device supporting the face authentication is installed in a narrow space, the distance between the users aligned in the gate device is short, and a plurality of persons may appear in the same image.

In this case, the gate device needs to select one face image from the plurality of face images and set the selected face image as the authentication target. For example, it is conceivable that the gate device calculates an area (size) for each of a plurality of face images and sets a face image having the largest area as an authentication target. The handling is based on the premise that the face image of the user aligned in the foremost row of the gate device is larger than the face image of the user aligned behind. However, the size of the face has a large individual difference, and in the above correspondence (determination of the authentication target based on the area of the face image), the user aligned behind the user aligned in the foremost row may be set as the authentication target.

A main object of the present disclosure is to provide a gate device, an authentication system, a gate device control method, and a storage medium that contribute to accurately determining a user of the authentication target.

Solution to Problem

According to a first aspect of the present disclosure, there is provided a gate device including: an acquisition unit configured to acquire an image from a camera; a setting unit configured, in a case where a plurality of users appears in the acquired image, to specify a user in a foremost row among the plurality of users according to positions of the plurality of users in the image, and set the specified user as an authentication target person; and a gate control unit configured to control a gate based on an authentication result of the authentication target person.

According to a second aspect of the present disclosure, there is provided an authentication system including: a server device configured to store biometric information of each of a plurality of system users and execute authentication processing using the plurality of pieces of biometric information; and a gate device connected to the server device. The gate device includes: an acquisition unit configured to acquire an image from a camera; a setting unit that configured, in a case where a plurality of users appears in the acquired image, to specify a user in a foremost row among the plurality of users according to positions of the plurality of users in the image, and set the specified user as an authentication target person; an authentication request unit configured to request a server device to authenticate the authentication target person; and a gate control unit configured to control a gate based on an authentication result of the authentication target person.

According to a third aspect of the present disclosure, there is provided a gate device control method including: in a gate device, acquiring an image from a camera; in a case where a plurality of users appears in the acquired image, specifying a user in a foremost row among the plurality of users according to positions of the plurality of users in the image, and setting the specified user as an authentication target person; and controlling a gate based on an authentication result of the authentication target person.

According to a fourth aspect of the present disclosure, there is provided a computer-readable storage medium storing a program for causing a computer mounted in a gate device to execute: acquiring an image from a camera; in a case where a plurality of users appears in the acquired image, specifying a user in a foremost row among the plurality of users according to positions of the plurality of users in the image, and setting the specified user as an authentication target person; and controlling a gate based on an authentication result of the authentication target person.

Advantageous Effects

According to each aspect of the present disclosure, a gate device, an authentication system, a gate device control method, and a storage medium that contribute to accurately determining a user of the authentication target are provided. Note that the effect of the present disclosure is not limited to the above. According to the present disclosure, other effects may be exhibited instead of or in addition to the effects.

BRIEF DESCRIPTION OF DRAWINGS

FIG. 18 is a diagram illustrating an example of a user database.

EXAMPLE EMBODIMENT

Figure 1:
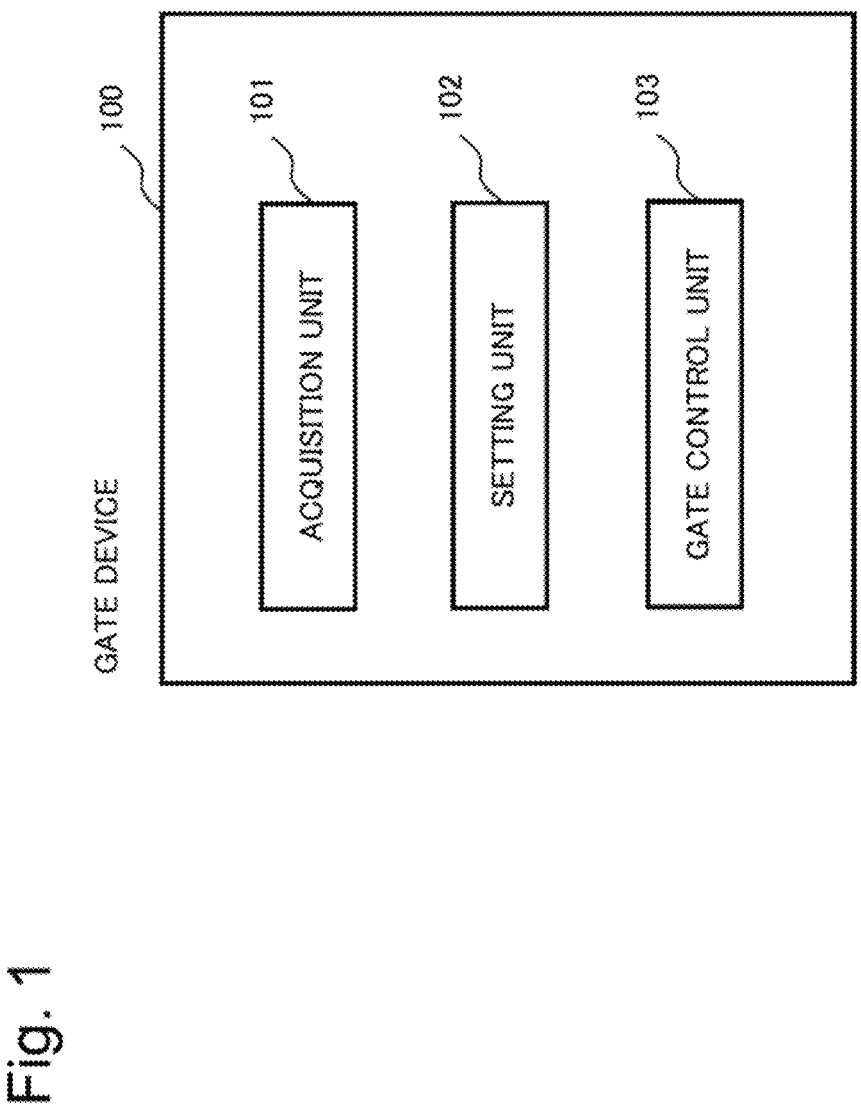
FIG. 1 is a diagram for explaining an outline of an example embodiment.

First, an outline of an example embodiment will be described. Note that the reference numerals in the drawings attached to this outline are attached to each element for convenience as an example for assisting understanding, and the description of this outline is not intended to be any limitation. In addition, in a case where there is no particular explanation, the block described in each drawing represents not a configuration of a hardware unit but a configuration of a functional unit. Connection lines between blocks in each drawing include both bidirectional and unidirectional lines. The unidirectional arrow schematically indicates a flow of a main signal (data), and does not exclude bidirectionality. Note that, in the present specification and the drawings, elements that can be similarly described are denoted by the same reference numerals, and redundant description can be omitted.

The gate device 100 according to one example embodiment includes an acquisition unit 101, a setting unit 102, and a gate control unit 103 (see FIG. 1). The acquisition unit 101 acquires an image from a camera. When a plurality of users is included in the acquired image, the setting unit 102 specifies a user on the foremost row among the plurality of users in accordance with the positions of the plurality of users in the image, and sets the specified user as an authentication target person. The gate control unit 103 controls a gate on the basis of an authentication result of the authentication target person.

The gate device 100 acquires an image from the camera. In a case where a plurality of users appears in the image, the gate device 100 specifies an authentication target person. For example, the gate device 100 specifies the user in the foremost row based on the position of the user appearing in the image. For example, the gate device 100 specifies the user appearing at the right end or the left end of the image among the plurality of users as the user in the foremost row. Whether the user at the right end is determined as the foremost row or the user at the left end is determined as the foremost row is based on the relationship between the traveling direction of the user and the installation position of the camera. Details of the relationship between the traveling direction of the user and the installation position of the camera will be described later. The gate device 100 specifies the user in the foremost row regardless of the size of the face area having a large individual difference, so that the user to be authenticated can be accurately determined.

Hereinafter, specific example embodiments will be described in more detail with reference to the drawings.

First Example Embodiment

A first example embodiment will be described in more detail with reference to the drawings.

Figure 2:
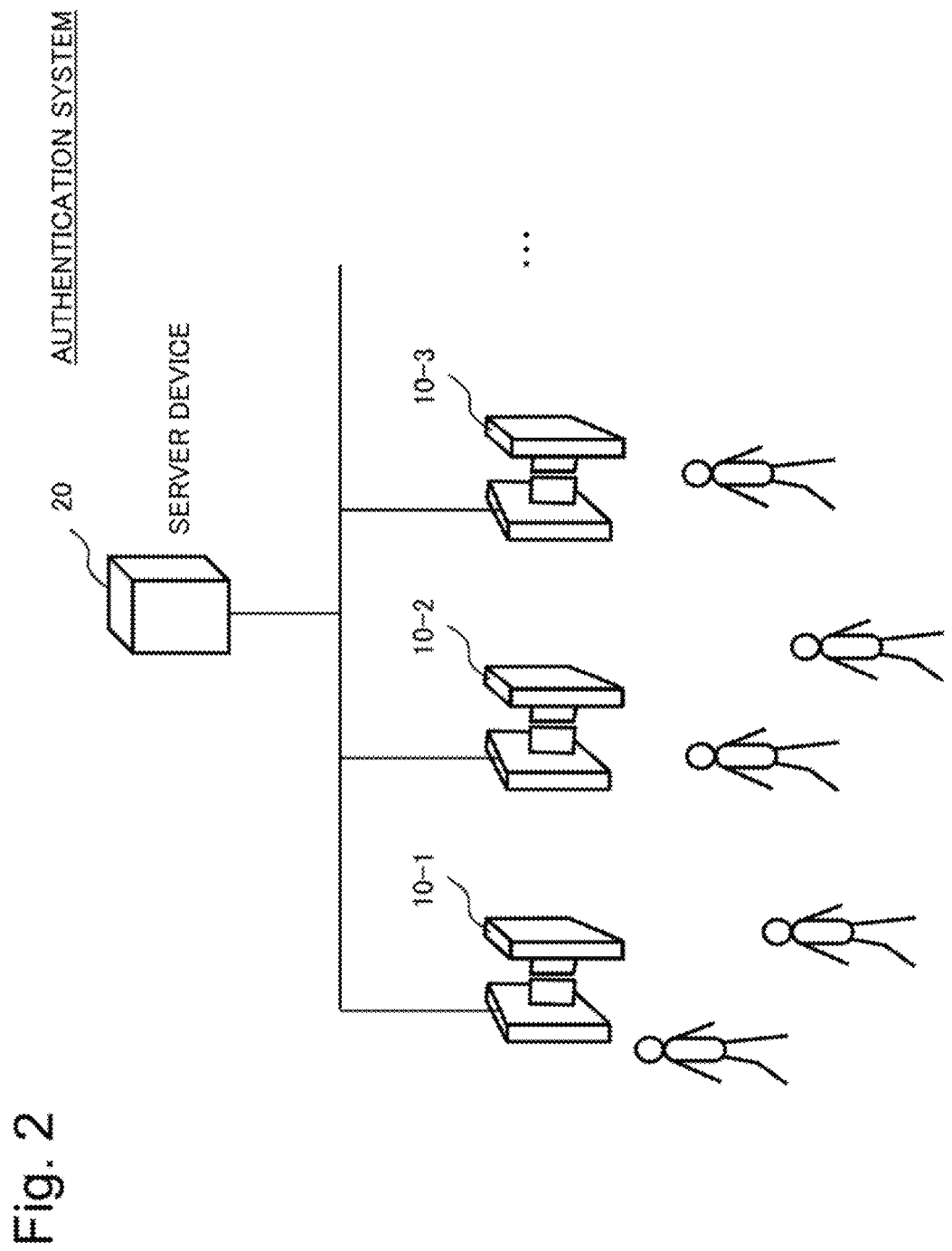
FIG. 2 is a diagram illustrating an example of a schematic configuration of an authentication system according to a first example embodiment.

FIG. 2 is a diagram illustrating an example of a schematic configuration of the authentication system according to the first example embodiment. Referring to FIG. 2, the authentication system includes a plurality of gate devices 10-1 to 10-3 and a server device 20.

In the following description, in a case where there is no particular reason to distinguish the gate devices 10-1 to 10-3, they are simply referred to as "gate device 10". Similarly, for other components, reference numerals on the left side separated by hyphens are used to represent the components.

The configuration illustrated in FIG. 2 is an example and is not intended to limit the number of gate devices 10 or the like. The authentication system may include at least one or more gate devices 10.

The gate device 10 and the server device 20 are configured to be able to communicate with each other by wired or wireless communication means. The server device 20 may be installed in the same building as the gate device 10, or may be installed on a network (cloud).

The gate device 10 is, for example, a device installed in an airport or a station. The gate device 10 controls passage of a user. The gate device 10 permits passage of a user (hereinafter, described as an authentication successful person) who has been successfully authenticated by the server device 20. The gate device 10 does not permit passage of a user who has not been authenticated by the server device 20 or a user who has failed in authentication.

The server device 20 is a device that performs authentication processing. Specifically, server device 20 stores biometric information of a user (system user) who can pass through the gate device 10. The server device 20 executes authentication processing using the biometric information acquired from the gate device 10 and the biometric information stored in advance, and notifies the gate device 10 of an authentication result (authentication success, authentication failure).

The gate device 10 opens the gate to allow the passing of the authentication successful person when the authentication successful person enters the internal area of the own device (the area surrounded by the main body of the gate device 10).

Examples of the biometric information of the user include data (feature amount) calculated from physical features unique to an individual such as a face and an iris pattern. Alternatively, the biometric information of the user may be image data such as a face image and an iris image. The biometric information of the user may include the physical feature of the user as information.

Next, details of each device included in the authentication system according to the first example embodiment will be described. In the following description, a "face image" of the user will be described as an example of the biometric information.

[Gate Device]

Figure 3:
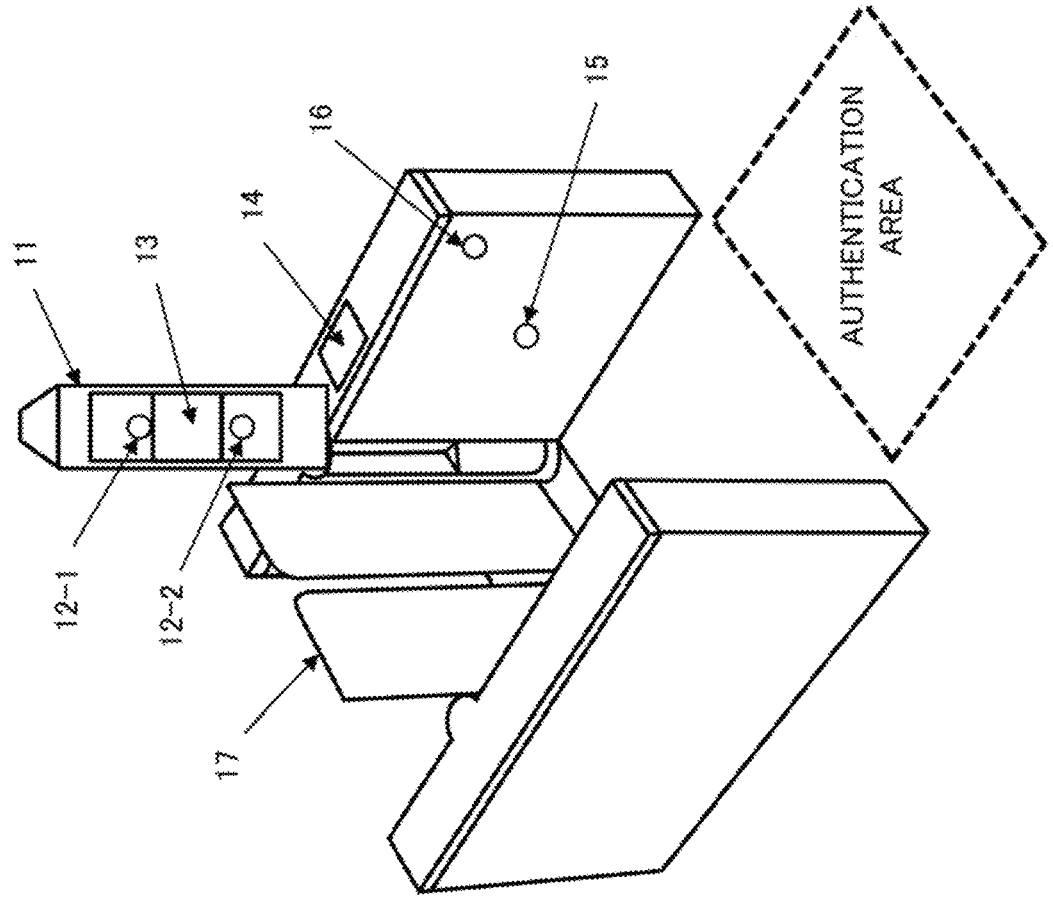
FIG. 3 is a diagram illustrating an example of an appearance of a gate device according to the first example embodiment.

FIG. 3 is a diagram illustrating an example of an appearance of the gate device 10 according to the first example embodiment.

Referring to FIG. 3, the gate device 10 includes a face authentication module 11. The face authentication module 11 is attached to the main body of the gate device 10. The face authentication module 11 includes two cameras (upper camera 12-1 and lower camera 12-2). Note that the "main body" of the gate device 10 is a structure forming the center of the gate device 10, and is a member that is in contact with the floor and to which a face authentication module and the like are attached.

Figure 4:
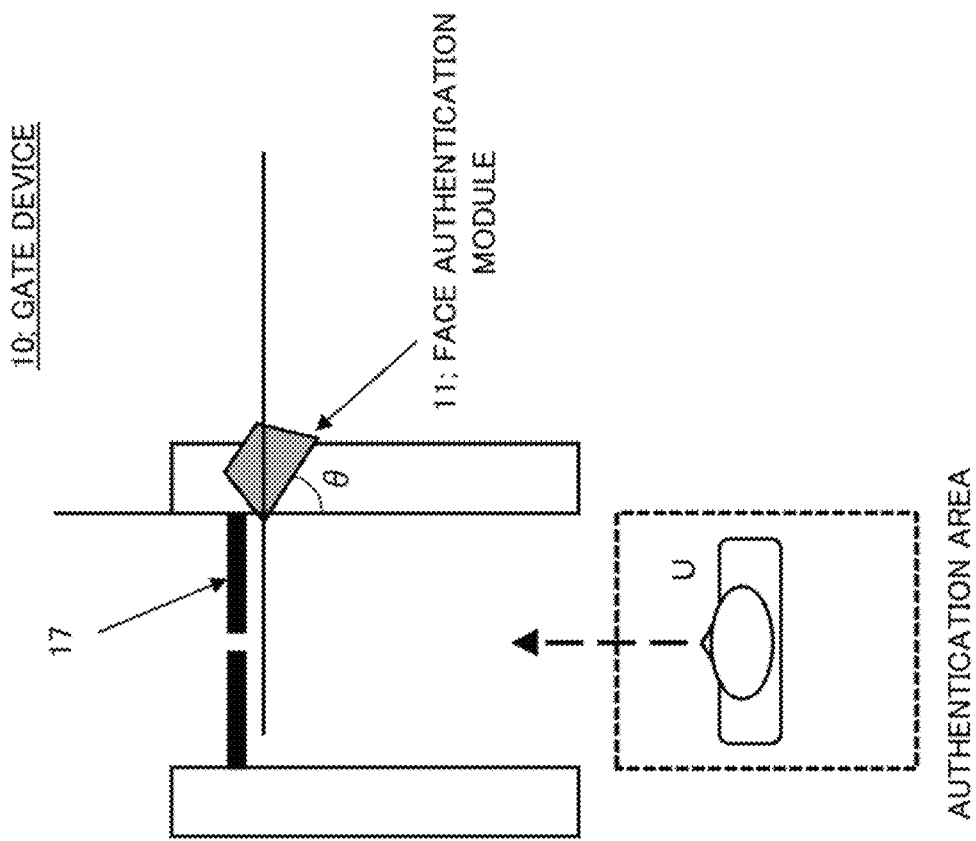
FIG. 4 is a diagram illustrating an example of a plan view of the gate device according to the first example embodiment.

The face authentication module 11 is installed to be inclined at a predetermined angle with respect to the direction in which the user walks toward the gate device 10. FIG. 4 is a diagram (plan view) illustrating a case where the gate device 10 is viewed from above.

As illustrated in FIG. 4, the face authentication module 11 is installed to be inclined at an angle θ with respect to the traveling direction of the user (the direction perpendicular to a gate 17). Note that the angle θ is selected (adjusted) so that the upper camera 12-1 and the lower camera 12-2 can image a user U in the authentication area.

When the angle θ is reduced, only the vicinity of the gate device 10 can be imaged, and there is a possibility that the user enters the inside (internal area) of the gate device 10 before the authentication processing using the face image is ended. In this case, the user needs to stop and stand by until the authentication processing is completed, and it cannot be said that comfortable walk-through can be achieved. On the other hand, when the angle θ is increased, it is possible to capture an image far away from the gate device 10. In this case, although it is advantageous for achieving a comfortable walk-through, there is a possibility that even a user who is not walking toward the own device may be authenticated. For example, in the example of FIG. 2, the gate device 10-1 captures an image of a user who is not walking toward the gate device 10-1, and requests the server device 20 for authentication. As described above, when the angle θ is too large, there is a possibility that useless authentication processing occurs. It is desirable that the administrator and the operator of the system determine the optimum angle in consideration of the advantages and disadvantages caused by the setting angle θ of the face authentication module 11 as described above. As a result of intensive studies by the inventors, it has been found that the angle θ is desirably selected from a range of 30 to 60 degrees.

Although FIGS. 3 and 4 illustrate an example in which the face authentication module 11 is installed on the right side with respect to the traveling direction of the user, it is a matter of course that the installation position of the face authentication module 11 is not limited to the right side. The face authentication module 11 may be installed on the left side with respect to the traveling direction of the user. Although FIGS. 3 and 4 illustrate an example in which the face authentication module 11 is directly installed in the main body of the gate device 10, the face authentication module 11 may be installed away from the main body of the gate device 10. Alternatively, the gate device 10 may be mounted on the ceiling portion (roof; not illustrated), the face authentication module 11 may be installed on the ceiling. The face authentication module 11 may be installed at a predetermined angle with respect to the traveling direction of the user.

The upper camera 12-1 is attached to the vertically upper side of the face authentication module 11. The lower camera 12-2 is attached to the vertically lower side of the face authentication module 11. That is, as illustrated in FIG. 3, the lower camera 12-2 is installed on the vertically lower side of the upper camera 12-1.

On the surface (camera installation surface) of the face authentication module, the positions of the two cameras in the perpendicular direction (vertical direction) are different as described above, but are attached at the same position in the horizontal direction (horizontal position). Similarly, in the depth direction of the two cameras, the two cameras are mounted on the same surface (camera installation surface). Note that the meaning of "the positions of the two cameras in the horizontal direction are the same" does not mean that the positions of the two cameras in the horizontal direction strictly coincide with each other, but allows some deviation. That is, the positions of the two cameras in the horizontal direction may be substantially the same.

The upper camera 12-1 and the lower camera 12-2 are cameras having substantially the same performance, and parameters such as an angle of view and a focal length are substantially the same. According to the method of installing the two cameras or the like as described above, the images obtained from the two cameras have different photographing ranges in the height direction, but have substantially the same photographing ranges in the horizontal direction.

Two cameras (upper camera 12-1 and lower camera 12-2) included in the gate device 10 are provided to authenticate every person (subject) from a short height to a high height. The upper camera 12-1 is installed to acquire a face image of a tall authentication target person. The lower camera 12-2 is installed to acquire a face image of a short authentication target person.

With these cameras, the face image of the tall authentication target person is acquired by the upper camera 12-1, and the face image of the short authentication target person is acquired by the lower camera 12-2. The face image of a medium-height authentication target person is acquired from both the upper camera 12-1 and the lower camera 12-2. Most of the users are classified as medium height, and it is rare that a face image is acquired from one of the upper camera 12-1 and the lower camera 12-2.

The upper camera 12-1 and the lower camera 12-2 operate in conjunction with each other. Specifically, the two cameras image the user at substantially the same timing.

As illustrated in FIG. 3, the face authentication module 11 includes a light emitting diode (LED) (not illustrated) for dimming and a display 13. The gate device 10 controls an environment (light irradiated to the user) at the time of acquiring the user's face image using the LED for dimming. The gate device 10 notifies the user of a necessary message or the like by using display 13. For example, the gate device 10 displays an authentication result (authentication success, authentication failure) by the server device 20.

The gate device 10 includes a display 14. The gate device 10 notifies the user of a necessary message or the like by using the display 14. For example, the gate device 10 displays an authentication result (authentication success, authentication failure) by the server device 20. Alternatively, the gate device 10 may notify the user of a necessary message by using a speaker (not illustrated).

The gate device 10 includes an area sensor 15. The area sensor 15 is a sensor that detects whether a person is present in a predetermined area (an area surrounded by a dotted line in FIG. 3) set in front of the gate device 10. The area sensor 15 can be configured using a sensor (so-called human sensor) using infrared rays.

When confirming that a person is present in the predetermined area based on the detection signal from the area sensor 15, the gate device 10 controls two cameras (upper camera 12-1 and lower camera 12-2) to acquire two images (image data). In the following description, an area where the area sensor 15 detects the presence of a person is referred to as an "authentication area". When detecting that the user is present in the authentication area, the gate device 10 captures an image of the user located in the authentication area.

The gate device 10 includes an in-gate sensor 16. The in-gate sensor 16 is a sensor for detecting that a person enters the inside of the own device (gate device 10). As the in-gate sensor 16, for example, a sensor (so-called passage sensor using light) including a light transmitting device and a light receiving device can be used. For example, the light transmitting device and the light receiving device are installed to face each other (two devices are installed on an inner wall of the main body). The transmitting device constantly transmits light, and the receiving device receives the transmitted light. The gate device 10 determines that a person enters the gate device 10 when the receiving device cannot receive the light. Note that FIG. 3 illustrates one of the two devices constituting the in-gate sensor 16. A plurality of pairs of in-gate sensors 16 may be provided at substantially equal intervals in the traveling direction of the person.

The gate device 10 includes the gate 17. When confirming that the user is present in the authentication area, the gate device 10 acquires a face image of the user. The gate device 10 generates a feature amount (biometric information) from the acquired image, and transmits an authentication request including the generated feature amount to the server device 20. The gate device 10 opens the gate 17 when the authentication successful person enters the internal area of the own device. The gate device 10 closes the gate 17 after the authentication successful person passes through the gate 17.

The type of the gate 17 is not particularly limited, and is, for example, a flapper gate in which a flapper provided from one side or both sides of the passage opens and closes, a turnstile gate in which three bars rotate, or the like.

Figure 5:
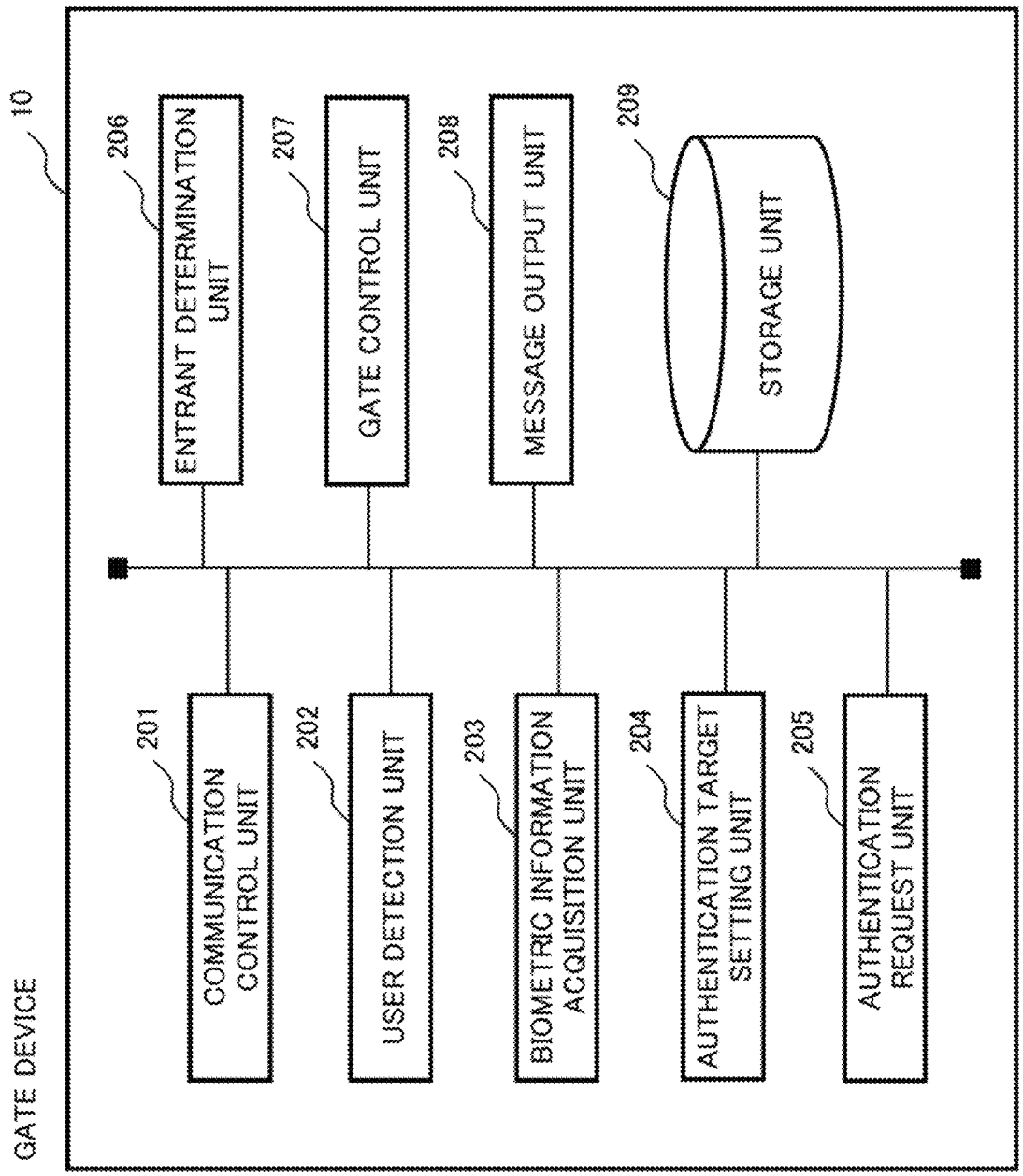
FIG. 5 is a diagram illustrating an example of a processing configuration of the gate device according to the first example embodiment.

FIG. 5 is a diagram illustrating an example of a processing configuration (processing module) of the gate device 10 according to the first example embodiment. Referring to FIG. 5, the gate device 10 includes a communication control unit 201, a user detection unit 202, a biometric information acquisition unit 203, an authentication target setting unit 204, an authentication request unit 205, an entrant determination unit 206, a gate control unit 207, a message output unit 208, and a storage unit 209.

The communication control unit 201 is a unit that controls communication with other devices. Specifically, the communication control unit 201 receives data (packet) from the server device 20. In addition, the communication control unit 201 transmits data to the server device 20. The communication control unit 201 delivers data received from another device to another processing module. The communication control unit 201 transmits data acquired from another processing module to another device. In this manner, the other processing modules transmit and receive data to and from other devices via the communication control unit 201.

The user detection unit 202 is a unit that detects a user located in the authentication area. The user detection unit 202 detects a user present in the authentication area on the basis of a detection signal from the area sensor 15. In a case where the output of the area sensor 15 indicates that "there is a user in the authentication area", the user detection unit 202 notifies the biometric information acquisition unit 203 of the fact.

The biometric information acquisition unit 203 is a unit that acquires the biometric information of the user present in the authentication area. Upon acquiring the notification related to "there is a user in the authentication area" from the user detection unit 202, the biometric information acquisition unit 203 controls the two cameras (upper camera 12-1 and lower camera 12-2) and captures an image of the user located in the authentication area.

Figure 6A:
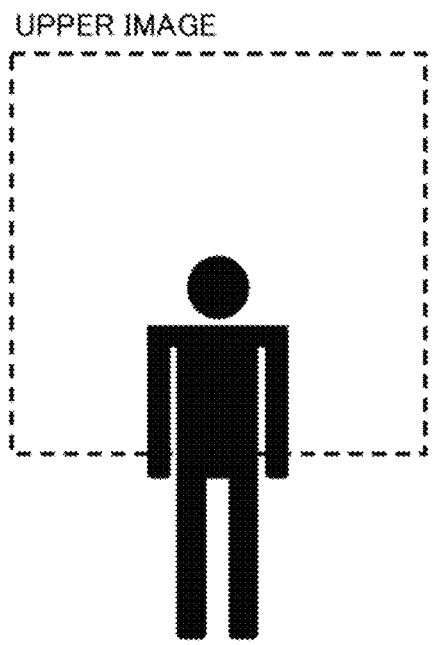
FIG. 6 is a diagram for explaining the operation of a biometric information acquisition unit according to the first example embodiment.

The biometric information acquisition unit 203 acquires images from each of the two cameras. As described above, the upper camera 12-1 is attached to the upper side of the face authentication module 11. Therefore, the image (hereinafter, referred to as an upper image) obtained from the upper camera 12-1 includes the upper side of the authentication area. For example, when a medium-height user is located in the authentication area, an upper image surrounded by a broken line in FIG. 6A is obtained.

Figure 6B:
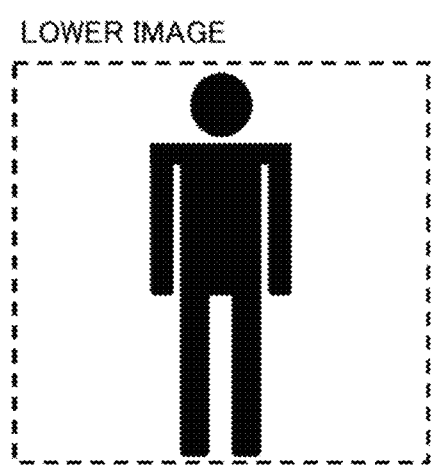

In contrast, the lower camera 12-2 is attached to the lower side of the face authentication module 11. Therefore, the image (hereinafter, referred to as a lower image) obtained from the lower camera 12-2 includes the lower side of the authentication area. For example, when a medium-height user is located in the authentication area, a lower image surrounded by a broken line in Fig. 6B is obtained.

Figure 6C:
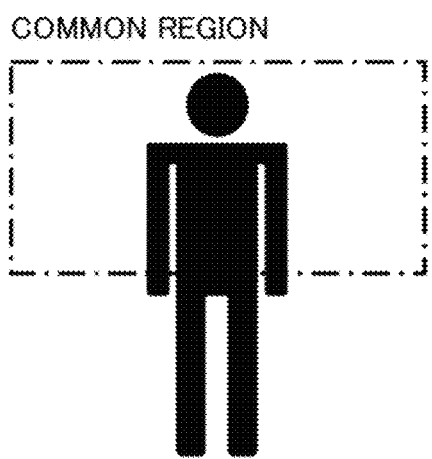

The upper image and the lower image include a common region. In the example of FIG. 6, a region indicated by a one-dot chain line in Fig. 6C is a region common to the upper image and the lower image. In the following description, a region common to the upper image and the lower image is referred to as a "common region".

The biometric information acquisition unit 203 delivers two images (upper image, lower image) captured by the upper camera 12-1 and the lower camera 12-2 to the authentication target setting unit 204.

The authentication target setting unit 204 is a unit that sets (determines) a user (authentication target person) to be authenticated from users appearing in an image. When there are a plurality of users in the authentication area, the authentication target setting unit 204 selects one user from the plurality of users and sets the selected user as the "authentication target person". The operation of the authentication target setting unit 204 will be described with reference to the flowchart illustrated in FIG. 7.

The authentication target setting unit 204 extracts a face image (Step S101). The authentication target setting unit 204 extracts a face image from the upper image. The authentication target setting unit 204 extracts a face image from the lower image. The authentication target setting unit 204 extracts a face image from the image using various methods. For example, the authentication target setting unit 204 extracts a face image (face area) from the image data using a learning model learned by a convolutional neural network (CNN). Alternatively, the authentication target setting unit 204 may extract the face image using a method such as template matching.

The authentication target setting unit 204 determines the distribution status of the face images in the two images (Step S102). The authentication target setting unit 204 determines whether the face image is included only in the upper image or the lower image or whether the face image is included in both the upper image and the lower image. In the former case, the processing in and after Step S103 is executed. In the latter case, the processing from Step S110 is executed.

When Step S102 is executed and it is determined that the face image is distributed in the upper image or the lower image, the authentication target setting unit 204 determines whether there is one face image included only in the upper image or the lower image (Step S103).

When one face image is included in the upper image or the lower image (Step S103: Yes branch), the authentication target setting unit 204 sets the face image as the authentication target (Step S104).

Figure 8A:
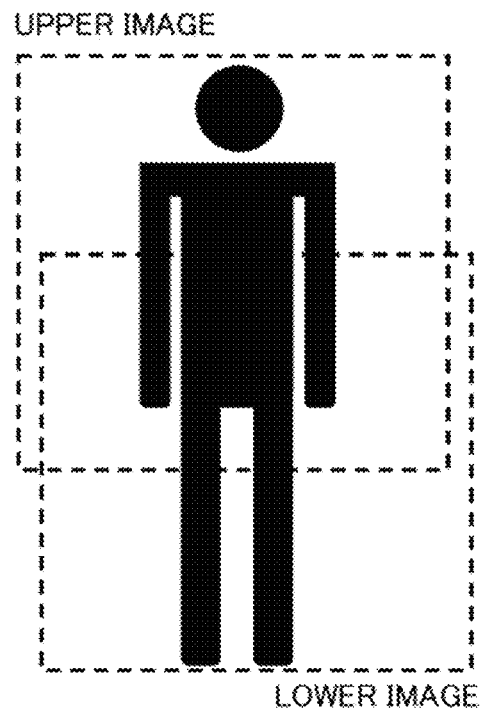
FIG. 8 is a diagram for explaining an operation of the authentication target setting unit according to the first example embodiment.
Figure 8B:
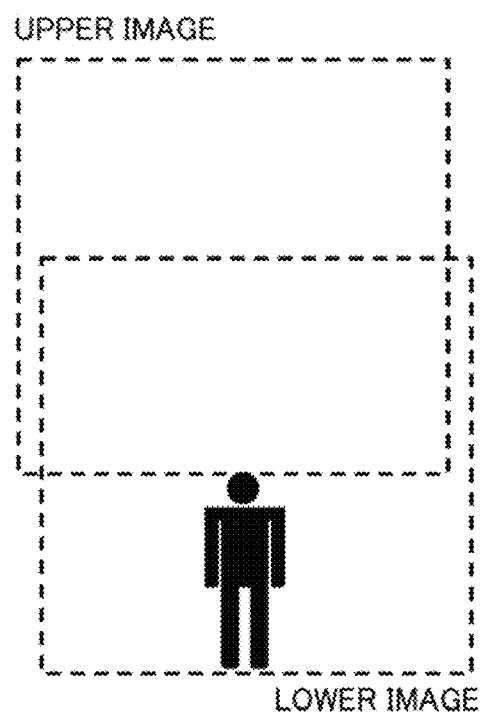

For example, as illustrated in Fig. 8A, the face image of the tall authentication target person is included only in the upper image. In addition, as illustrated in FIG. 8B, the face image of the short authentication target person is included only in the lower image. In the case illustrated in FIG. 8, the authentication target setting unit 204 sets the face image included in the upper image and the face image included in the lower image as the authentication target (the face image of the authentication target person). Note that, in the drawings including FIG. 8, the range of each image is moved in the horizontal direction in order to facilitate distinction between the upper image and the lower image.

When two or more face images are included in the upper image or the lower image (Step S103: No branch), the authentication target setting unit 204 sets an error (Step S105).

Figure 9A:
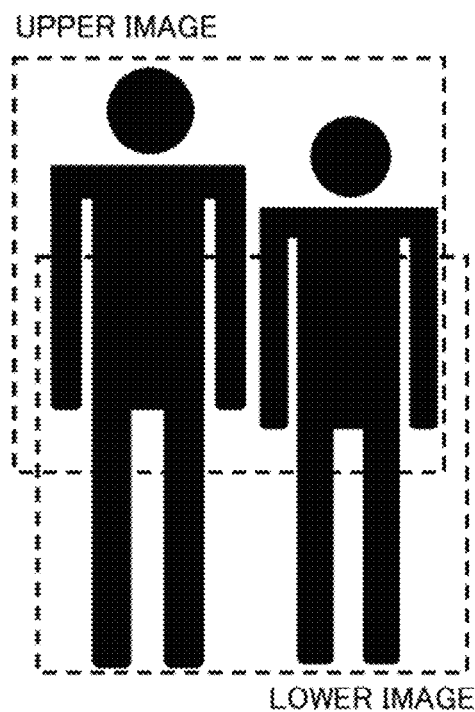
FIG. 9 is a diagram for explaining an operation of the authentication target setting unit according to the first example embodiment.
Figure 9B:
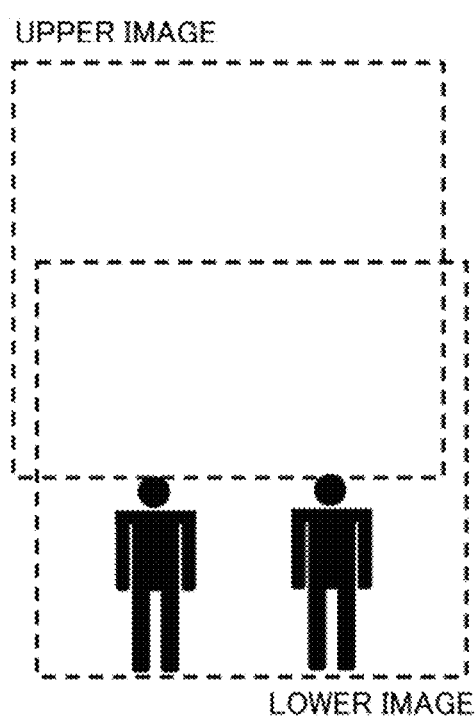

For example, as illustrated in FIGS. 9(a) and 9(b), an error is set when a plurality of face images is included only in the upper image or the lower image. In the case illustrated in FIG. 9, it is difficult to determine which one of the plurality of face images is set as the authentication target. However, the situation illustrated in FIG. 9 rarely occurs. When such a situation occurs, the gate device 10 takes a measure such as instructing the user to leave the authentication area.

Figure 7:
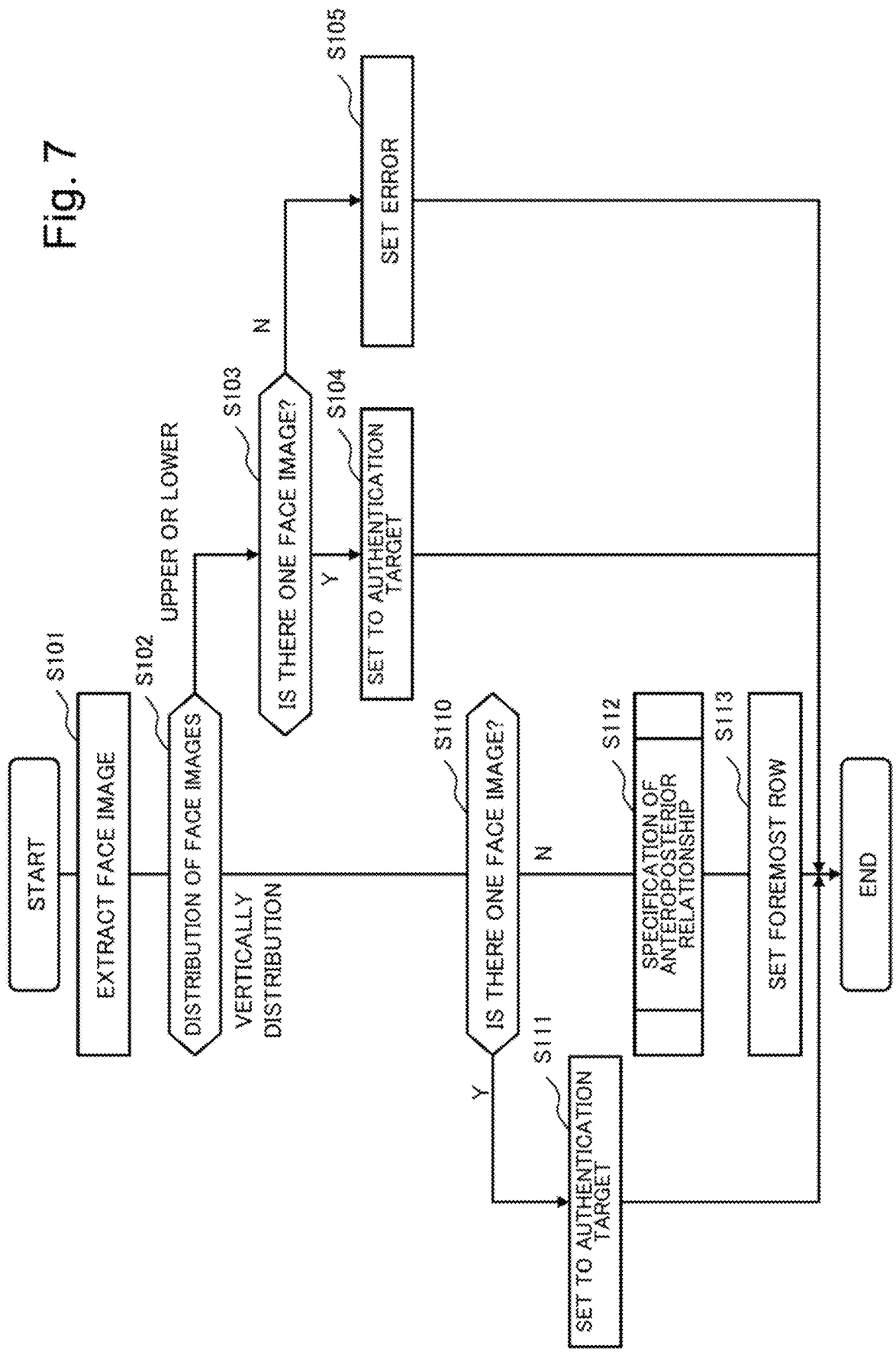
FIG. 7 is a flowchart illustrating an example of an operation of an authentication target setting unit according to the first example embodiment.

As described above, in a case where the face image is distributed in each of the upper image and the lower image, the processing after Step S110 illustrated in FIG. 7 is executed.

The authentication target setting unit 204 determines whether one face image is included in each of the upper image and the lower image (Step S110).

Figure 10A:
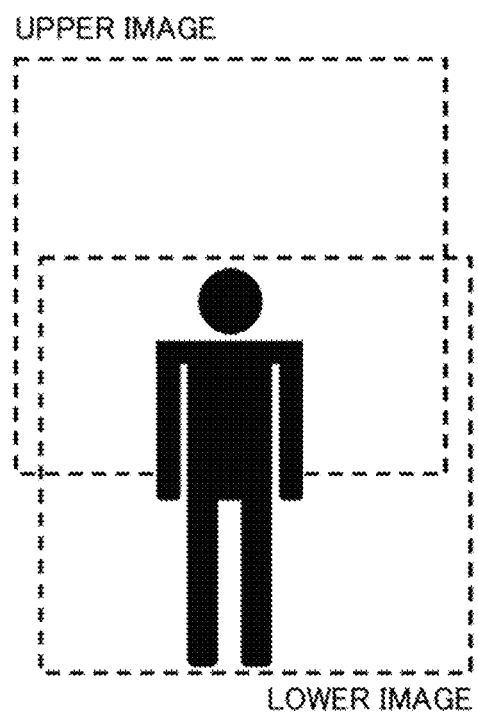
FIG. 10 is a diagram for explaining the operation of the authentication target setting unit according to the first example embodiment.
Figure 10B:
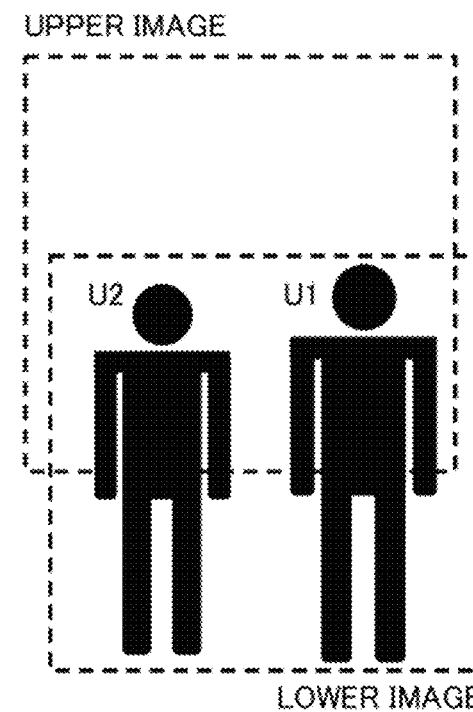

Specifically, the authentication target setting unit 204 determines whether a situation as illustrated in FIG. 10A has occurred or a situation as illustrated in FIG. 10B has occurred.

When one face image is included in each of the upper image and the lower image (Step S110: Yes branch), the authentication target setting unit 204 sets the face image included in either the upper image or the lower image as the authentication target (Step S111). In the example of FIG. 10A, a face image extracted from either the upper image or the lower image is set as the authentication target.

When two or more face images are included in each of the upper image and the lower image (Step S110: No branch), the authentication target setting unit 204 specifies the antero-posterior relationship of each user (Step S112). In the example of Fig. 10B, which of a user U1 and a user U2 is walking in front is identified (determined). Details regarding the identification processing of the anteroposterior relationship will be described later.

The authentication target setting unit 204 sets a user in the foremost row (forefront) among a plurality of users (a plurality of users present in the authentication area) as the authentication target (Step S113). In the example of Fig. 10B, in a case where the user U1 is walking in front of the user U2(in a case where the user U1 is closer to the gate device 10 than the user U2), the face image of the user U1 is set as the authentication target.

As described above, when one user appears in both the upper image and the lower image, the authentication target setting unit 204 sets the one user as the authentication target person. In addition, when one user appears in one of the upper image and the lower image, the authentication target setting unit 204 sets the one user as the authentication target person.

Note that the authentication target setting unit 204 desirably confirms whether the users appearing in the upper image and the lower image are the same person before setting the authentication target in Step S111. Specifically, the authentication target setting unit 204 calculates the feature amount from each of the two face images. The authentication target setting unit 204 determines whether the two feature amounts substantially match. The authentication target setting unit 204 calculates similarity between two feature amounts (feature vectors). If the calculated similarity is equal to or more than a predetermined value, the authentication target setting unit 204 determines that the two feature amounts substantially match. That is, the authentication target setting unit 204 determines whether the two face images are face images of the same person by one-to-one collation using the feature amounts generated from the upper face image and the lower face image. When the two feature amounts do not match, the authentication target setting unit 204 may set an error. That is, a situation in which one face image is included in each of the upper image and the lower image and each face image is not a face image of the same person does not usually occur. Therefore, it is appropriate to set the situation as an error.

In addition, in a case where there are one tall authentication target person and one short authentication target person in the authentication area, the processing related to Step S112 is executed. However, in this case, since there is no common region between the upper image and the lower image, the anteroposterior relationship in Step S112 cannot be specified. Therefore, when the above situation occurs, the authentication target setting unit 204 sets an error.

Figure 11:
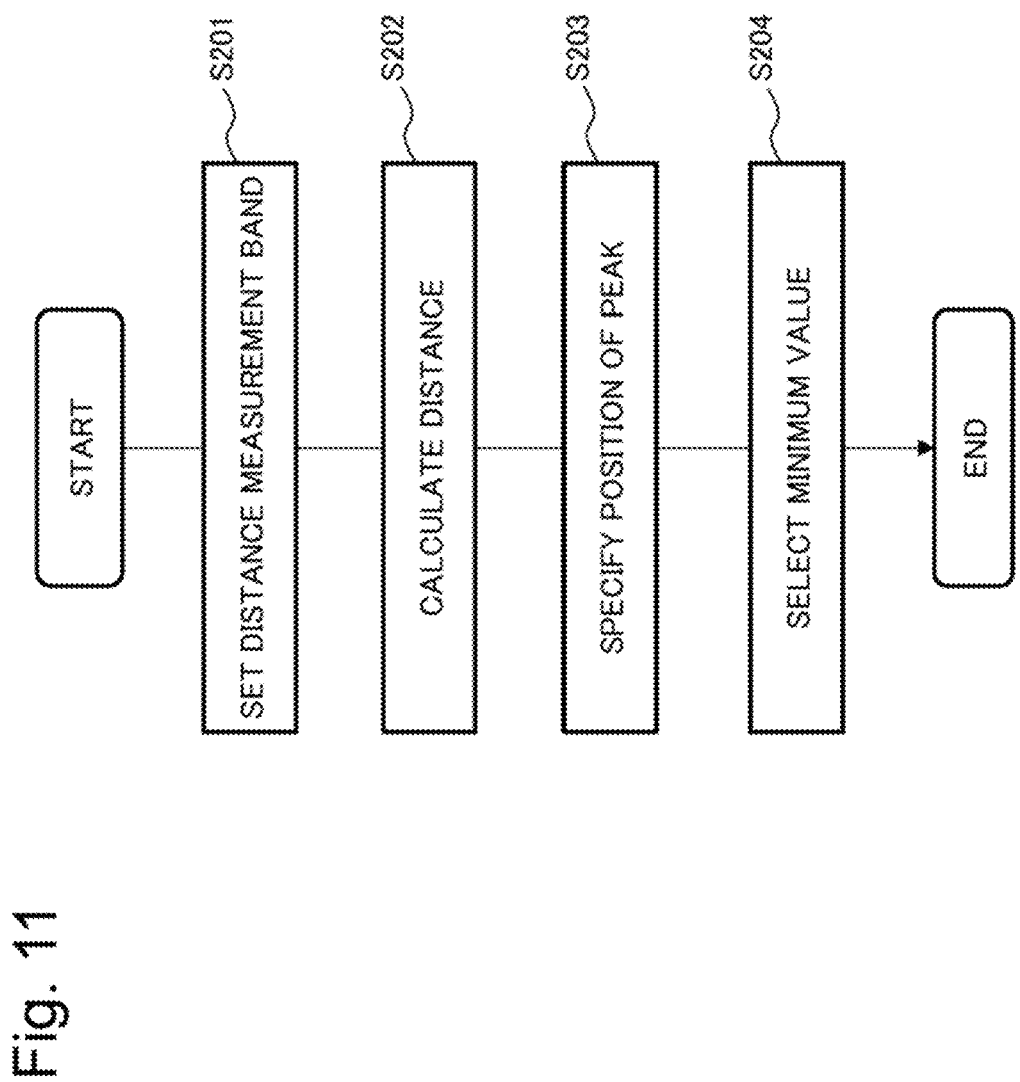
FIG. 11 is a flowchart illustrating an example of anteroposterior relationship specifying processing of the authentication target setting unit according to the first example embodiment.

Next, the processing (the identification processing of the anteroposterior relationship) according to Step S112 in FIG. 7 will be described. FIG. 11 is a flowchart illustrating an example of the anteroposterior relationship specifying processing of the authentication target setting unit 204.

Figure 12:
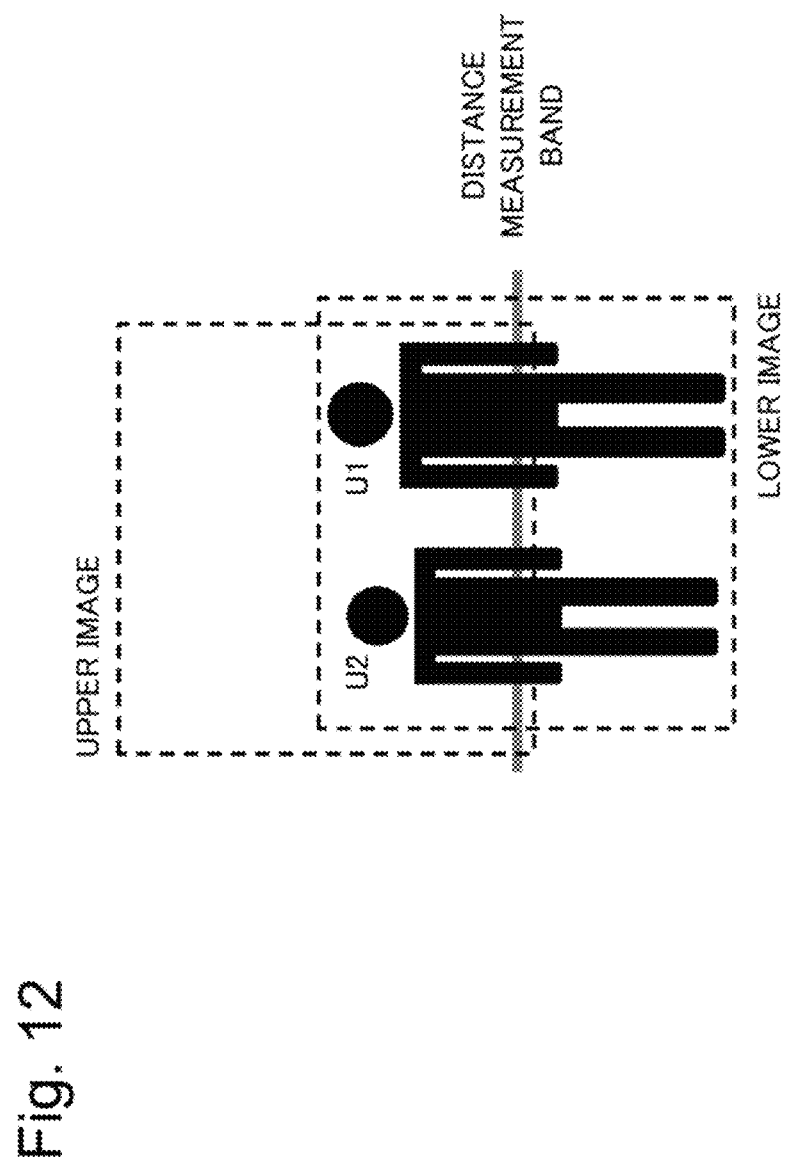
FIG. 12 is a diagram for explaining the operation of the authentication target setting unit according to the first example embodiment.

The authentication target setting unit 204 sets the "distance measurement band" in the common region of the two images (upper image, lower image) (Step S201). For example, in a case where the upper image and the lower image illustrated in FIG. 12 are obtained, the region colored in gray is set as the "distance measurement band". As illustrated in FIG. 12, the distance measurement band is desirably set on the lower side of the upper image. The distance measurement band is set to a region in which two or more users simultaneously appear in the common region. In an extreme example, the distance measurement band may be set at the lowermost side of the upper image, or the entire common region may be set as the distance measurement band. The authentication target setting unit 204 sets all or a part of the upper image and the lower image in the distance measurement band.

The authentication target setting unit 204 calculates the distance to the camera installation surface for the object appearing in the distance measurement band (all or part of the common region common to the upper image and the lower image) (Step S202). Specifically, the authentication target setting unit 204 calculates the distance to the camera (upper camera 12-1 and lower camera 12-2) installation surface for each small area included in the distance measurement band. The authentication target setting unit 204 calculates the distance between each small area (object) and the camera installation surface using the parallax (deviation between upper image and lower image) of the two images.

The authentication target setting unit 204 calculates a deviation amount (parallax) between the upper image and the lower image regarding the object included in the distance measurement band. The authentication target setting unit 204 calculates the distance between the object and the camera installation surface using the calculated parallax. That is, the authentication target setting unit 204 calculates the distance between the camera installation surface and the object (small region of the distance measurement band) using a so-called stereo method. Although the calculation of the distance using the stereo method is obvious to those skilled in the art and detailed description is omitted, the authentication target setting unit 204 calculates the distance between the camera installation surface and the object by the following method.

The authentication target setting unit 204 divides the distance measurement band into a plurality of small areas. For example, the authentication target setting unit 204 divides the distance measurement band such that the size of one area is A1×A2 pixels. The authentication target setting unit 204 calculates a distance D between the small area (object) and the camera installation surface by the following Expression (1).

[Math. 1]

$$D = B \times f / Z \quad (1)$$

Figure 13:
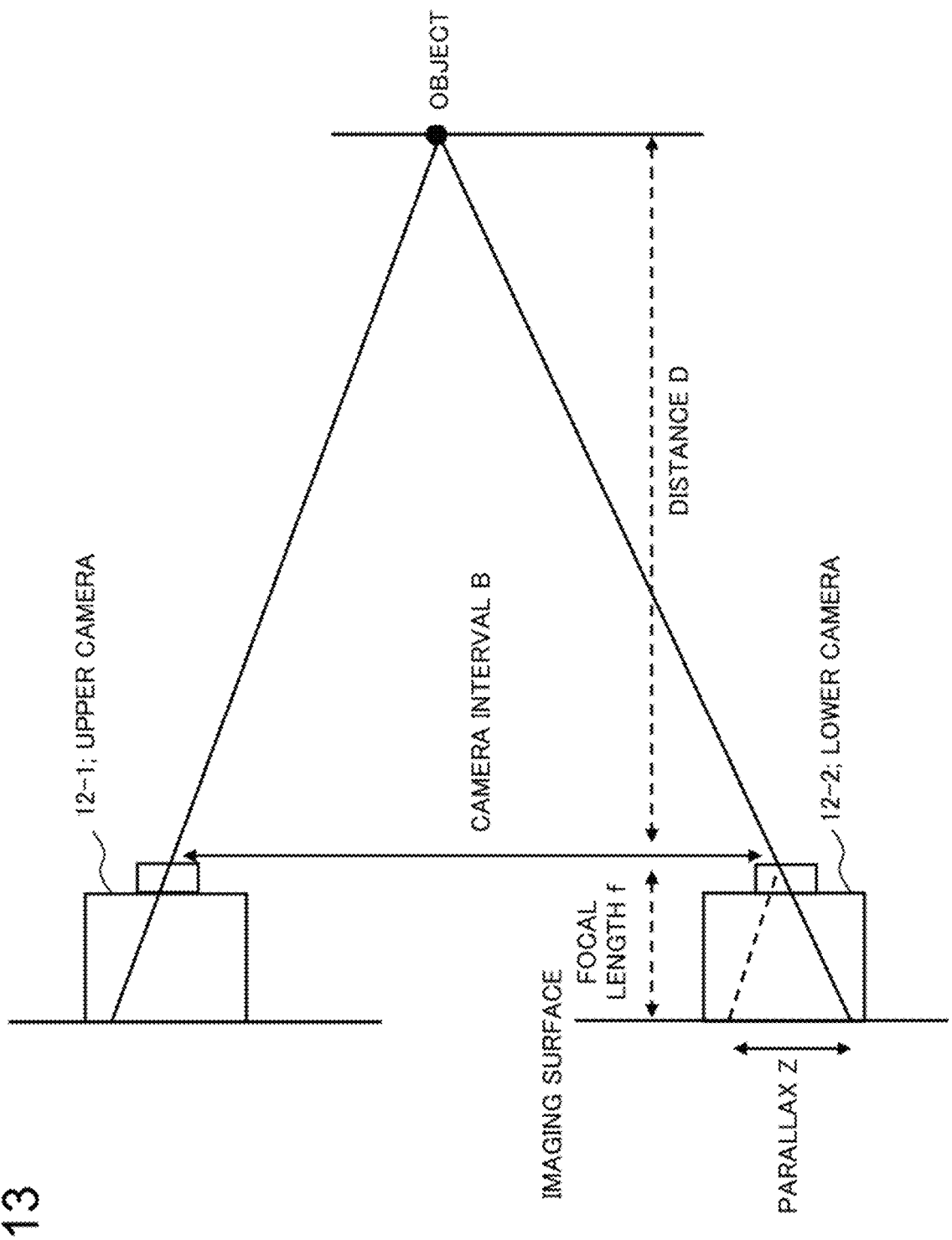
FIG. 13 is a diagram for explaining the operation of the authentication target setting unit according to the first example embodiment.

In Expression (1), B is a distance (camera interval) between the upper camera 12-1 and the lower camera 12-2. f is the focal length of the two cameras. Z is parallax (deviation amount). FIG. 13 illustrates the relationship between the parameters expressed by Expression (1).

In Expression (1), the camera interval B and the focal length f are values determined in advance according to the installation and selection of the two cameras. Therefore, the authentication target setting unit 204 can calculate the distance D by obtaining the parallax Z.

The authentication target setting unit 204 searches for a region having a matching pattern in a small region forming a common region band of the reference camera (the upper camera 12-1) with respect to one small region in the image (distance measurement band) of the camera (the lower camera 12-2 in FIG. 13) as a base. For example, the authentication target setting unit 204 calculates a city block distance for each small region, and selects a region having the shortest distance as a region with the same pattern. The authentication target setting unit 204 calculates a deviation between the small region on the base camera side and the small region on the reference camera side selected as described above as the parallax Z.

Figure 14:
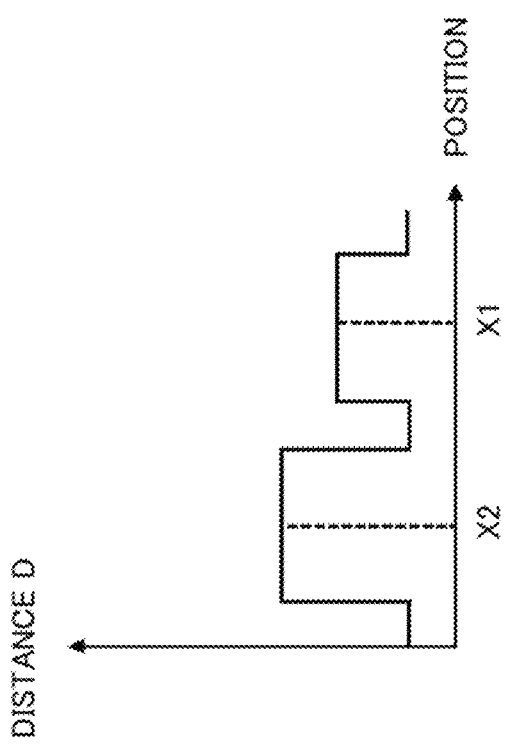
FIG. 14 is a diagram illustrating an example of a graph illustrating a correspondence relationship between a distance between a camera installation surface and an object and a position of the object in a common region.

For example, when the distance D between the object included in the distance measurement band illustrated in FIG. 12 and the camera installation surface is calculated, and the position (position in the horizontal direction) of the object is set to the X axis and the calculated distance D is set to the Y axis, a graph as illustrated in FIG. 14 is obtained.

In order to obtain a waveform as illustrated in FIG. 14, the authentication target setting unit 204 desirably performs predetermined data processing or the like on the calculated distance D. For example, in order to remove a high frequency component (a high frequency component of the distance D) caused by noise included in the image, the authentication target setting unit 204 may apply a low pass filter (LPF) to the calculated distance D. Alternatively, in a case where the variation of the distance D falls within a predetermined range, the authentication target setting unit 204 may execute processing of converging each value of the distance D to a predetermined value (for example, the average value of the variation values).

As illustrated in FIG. 14, when a plurality of users is imaged by the upper camera 12-1 and the lower camera 12-2, peaks depending on the number of people appearing in the two images appear. In the examples of FIGS. 12 and 14, two peaks appear.

The authentication target setting unit 204 specifies a position (X coordinate) where each peak appears (Step S203). In the example of FIG. 14, coordinates X1 and X2 are specified. That is, the authentication target setting unit 204 specifies (searches) peaks depending on the number of the plurality of users in the position of the object (the position of the object in the image) and the distance (for example, a graph of FIG. 14 illustrating the relationship between the position and the distance) to the camera installation surface of the object.

The authentication target setting unit 204 specifies the peak of the distance D using an arbitrary method. For example, the authentication target setting unit 204 calculates a difference between data regarding the distance D, and sets a point at which the calculated difference changes from positive to negative as a peak. It is desirable that the authentication target setting unit 204 specify the peak from the data to which the filtering processing and the convergence processing are applied.

The authentication target setting unit 204 selects the X coordinate related to the minimum peak value (Step S204). The user (face image) located on the vertically upper side of the selected X coordinate is specified as a person in the foremost row of the authentication area. In the examples of FIGS. 12 and 14, the user U1 located above the coordinate X1 is specified as the user in the foremost row. That is, the authentication target setting unit 204 treats the user at the position related to the minimum peak value among the plurality of specified peaks as the user in the foremost row.

The authentication target setting unit 204 sets the face image of the user in the foremost row as the authentication target (Step S113 in FIG. 7). As described above, in a case where a plurality of users appears in both the upper image and the lower image, the authentication target setting unit 204 specifies the user in the foremost row from among the plurality of users by calculating the distance between each of the plurality of users and the camera installation surface. The authentication target setting unit 204 sets the specified user as an authentication target person.

The authentication target setting unit 204 delivers the face image (biometric information) of the authentication target person to the authentication request unit 205.

The authentication request unit 205 is a unit that requests the server device 20 to authenticate the authentication target person. The authentication request unit 205 generates a feature amount (a feature vector including a plurality of feature amounts) from the face image acquired from the biometric information acquisition unit 203. The authentication request unit 205 transmits an authentication request including the generated feature amount (biometric information) to the server device 20.

Note that an existing technique can be used for the feature amount generation processing by the authentication request unit 205, and thus, a detailed description thereof will be omitted. For example, the authentication request unit 205 extracts eyes, a nose, a mouth, and the like as feature points from the face image. Thereafter, the authentication request unit 205 calculates the position of each feature point and the distance between the feature points as feature amounts, and generates a feature vector (vector information characterizing the face image) including a plurality of feature amounts.

Figure 15:
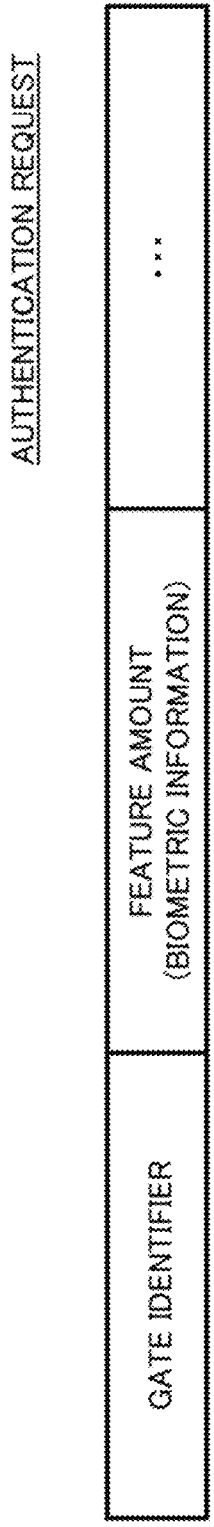
FIG. 15 is a diagram illustrating an example of an authentication request.

The authentication request unit 205 generates an authentication request including an identifier (hereinafter, referred to as a gate identifier) of the own device, a feature amount, and the like (see FIG. 15). As the gate identifier, a media access control (MAC) address or an Internet protocol (IP) address of the gate device 10 can be used.

When transmitting the authentication request to the server device 20, the authentication request unit 205 delivers the feature amount included in the request to the entrant determination unit 206.

The authentication request unit 205 receives a response to the authentication request from the server device 20. The authentication request unit 205 delivers a response (authentication success, authentication failure) from the server device 20 to the gate control unit 207.

The entrant determination unit 206 is a unit that detects an entrant using the in-gate sensor 16 for detecting an entrant into the own device (gate device 10) and determines whether the entrant and the authentication target person are the same person. The entrant determination unit 206 monitors (polls) the output of the in-gate sensor 16. When the output of the in-gate sensor 16 indicates "there is an entrant inside", the entrant determination unit 206 determines whether the entrant and the authentication target person match. Specifically, similarly to the biometric information acquisition unit 203, the entrant determination unit 206 controls at least one camera to acquire a face image. The entrant determination unit 206 calculates a feature amount (a feature amount of an entrant) from the obtained face image.

The entrant determination unit 206 determines whether the calculated feature amount (the feature amount of the entrant) and the feature amount (the feature amount of the authentication target person) acquired from the authentication request unit 205 substantially match. Specifically, the entrant determination unit 206 calculates the similarity between the two feature amounts. A chi-square distance, a Euclidean distance, or the like can be used for the similarity. Note that the similarity is lower as the distance is longer, and the similarity is higher as the distance is shorter. When the similarity is equal to or greater than a predetermined value, the entrant determination unit 206 determines that the two feature amounts substantially match (the entrant and the authentication target person are the same person).

In this manner, the entrant determination unit 206 detects an entrant based on the detection signal from a passage sensor (the in-gate sensor 16) using light. Thereafter, the entrant determination unit 206 performs one-to-one collation using two feature amounts (feature amount of entry person, feature amount of authentication target person). Whether the entrant and the authentication target person are the same person is determined by the one-to-one collation (one-to-one collation using the biometric information of the entrant and the biometric information of the authentication target person).

When determining that the entrant and the authentication target person are the same person, the entrant determination unit 206 notifies the gate control unit 207 of the fact.

The gate control unit 207 is a unit that controls the gate 17 included in the gate device 10. The gate control unit 207 controls the gate 17 based on the authentication result of the authentication target person. The gate control unit 207 opens the gate 17 when the authentication result of the server device 20 is "authentication success" and the entrant and the authentication target person are the same person. In other words, in principle, the gate control unit 207 does not open the gate 17 unless the above condition (authentication success, the entrant and the authentication target person are the same person) is satisfied. The gate control unit 207 closes the gate 17 after a user permitted to pass by using a distance sensor or the like passes through the gate 17.

The message output unit 208 is a unit that outputs a message to be notified to the user (authentication target person, authentication successful person, etc.). The message output unit 208 notifies the user of a necessary message using the displays 13 and 14, a speaker, or the like.

The storage unit 209 is a unit that stores information necessary for the operation of the gate device 10.

Figure 16:
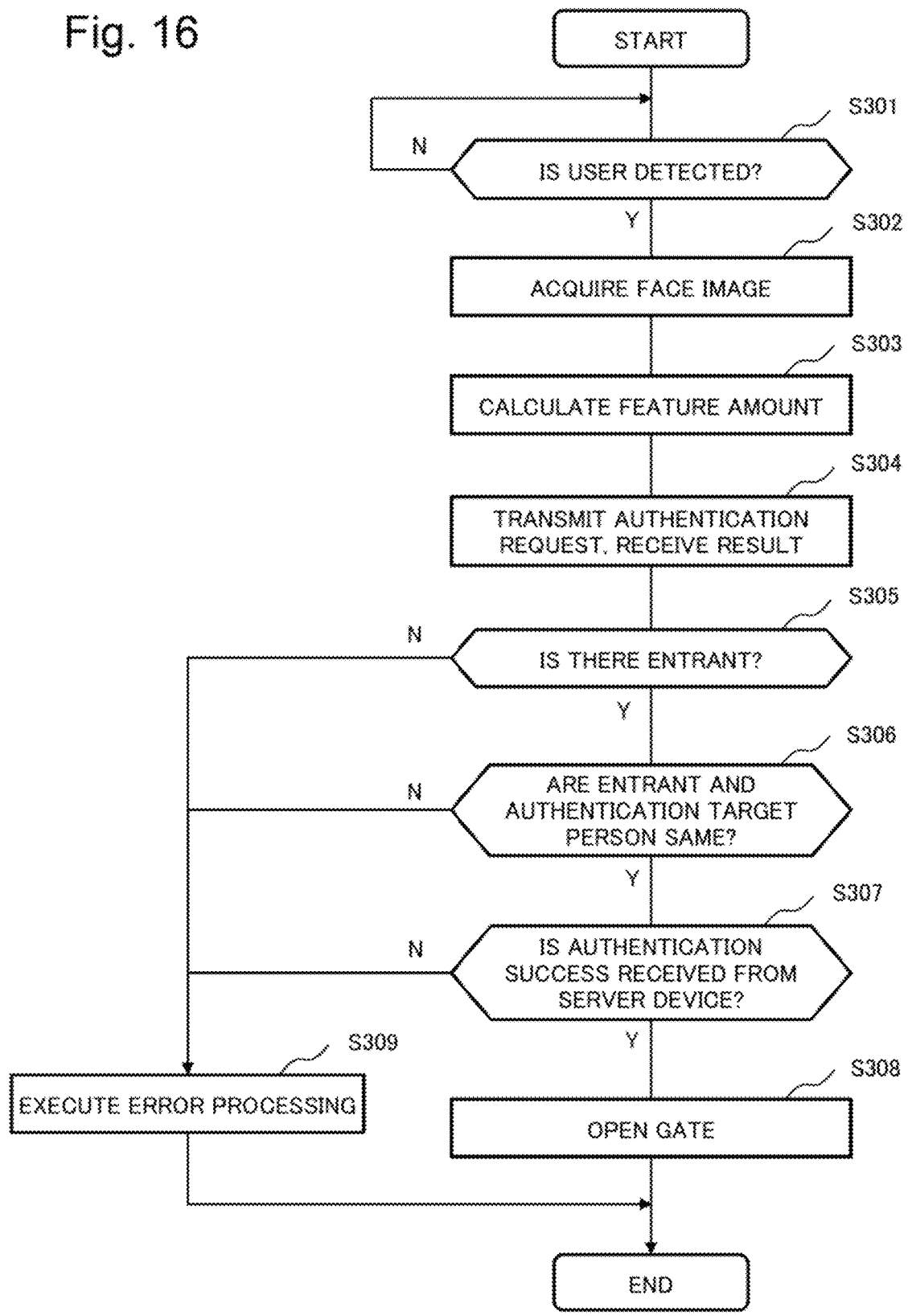
FIG. 16 is a flowchart illustrating an example of an operation of the gate device according to the first example embodiment.

FIG. 16 is a flowchart illustrating an example of the operation of the gate device 10 according to the first example embodiment.

The gate device 10 detects whether the user is present in the authentication area (Step S301). When the user is not detected in the authentication area (Step S301: No branch), the gate device 10 repeats the process in Step S301.

When the user is detected (Step S301: Yes branch), the gate device 10 images the user located in the authentication area and acquires the face image (Step S302).

The gate device 10 calculates a feature amount from the face image (Step S303).

The gate device 10 transmits an authentication request including the calculated feature amount to the server device 20, and receives a response (authentication result) to the authentication request (Step S304).

The gate device 10 determines whether an entrant is present in the internal area of the own device (Step S305). When the entrant cannot be detected even after the lapse of a predetermined time from the start of the process of detecting the entrant (Step S305: No branch), the gate device 10 executes the processing related to Step S309.

When the entrant is detected during the predetermined period (Step S305: Yes branch), the gate device 10 determines whether the entrant and the authentication target person are the same person (Step S306). When the entrant and the authentication target person are not the same person (Step S306: No branch), the gate device 10 executes the processing related to Step S309.

If the entrant and the authentication target person are the same person (Step S306: Yes branch), the gate device 10 determines whether the authentication result acquired from the server device 20 is "authentication success" (Step S307). When the authentication result is "authentication failure", the gate device 10 executes the processing related to Step S309. Note that it is a matter of course that the processing related to Step S307 may be executed before the processing related to Step S305.

If the authentication result is "authentication success", the gate device 10 opens the gate 17 (Step S308). When a gate opening condition (the authentication success, and the entrant and the authentication target person are the same person) is satisfied, the gate device 10 controls the gate 17 so that the authentication target person can pass through. At that time, the gate device 10 may display on displays 13 and 14 that the authentication of the authentication target person has succeeded.

When the above condition is not satisfied (No branch in any of Steps S305, S306, and S307), the gate device 10 performs error processing (Step S309). Specifically, when the entrant cannot be detected during the predetermined period (Step S305: No branch), the gate device 10 discards the authentication result acquired from the server device 20. When the entrant and the authentication target person are different (Step S306: No branch), the gate device 10 displays the fact on the displays 13 and 14. When the authentication by the server device 20 fails (Step S307: No branch), the gate device 10 displays the fact on the displays 13 and 14.

In this way, the gate device 10 acquires the biometric information (face image) on the users from the short height to the high height using the two cameras (upper camera 12-1 and lower camera 12-2) installed vertically. In addition, the gate device 10 uses the parallax of the object commonly appearing in the images obtained from the two cameras, determines the anteroposterior relationship in a case where a plurality of users is imaged, and specifies the correct authentication target person. That is, the gate device 10 uses the two cameras to acquire biometric information from users having greatly different heights without omission, and prevents erroneous determination of the authentication target person.

[Server Device]

Figure 17:
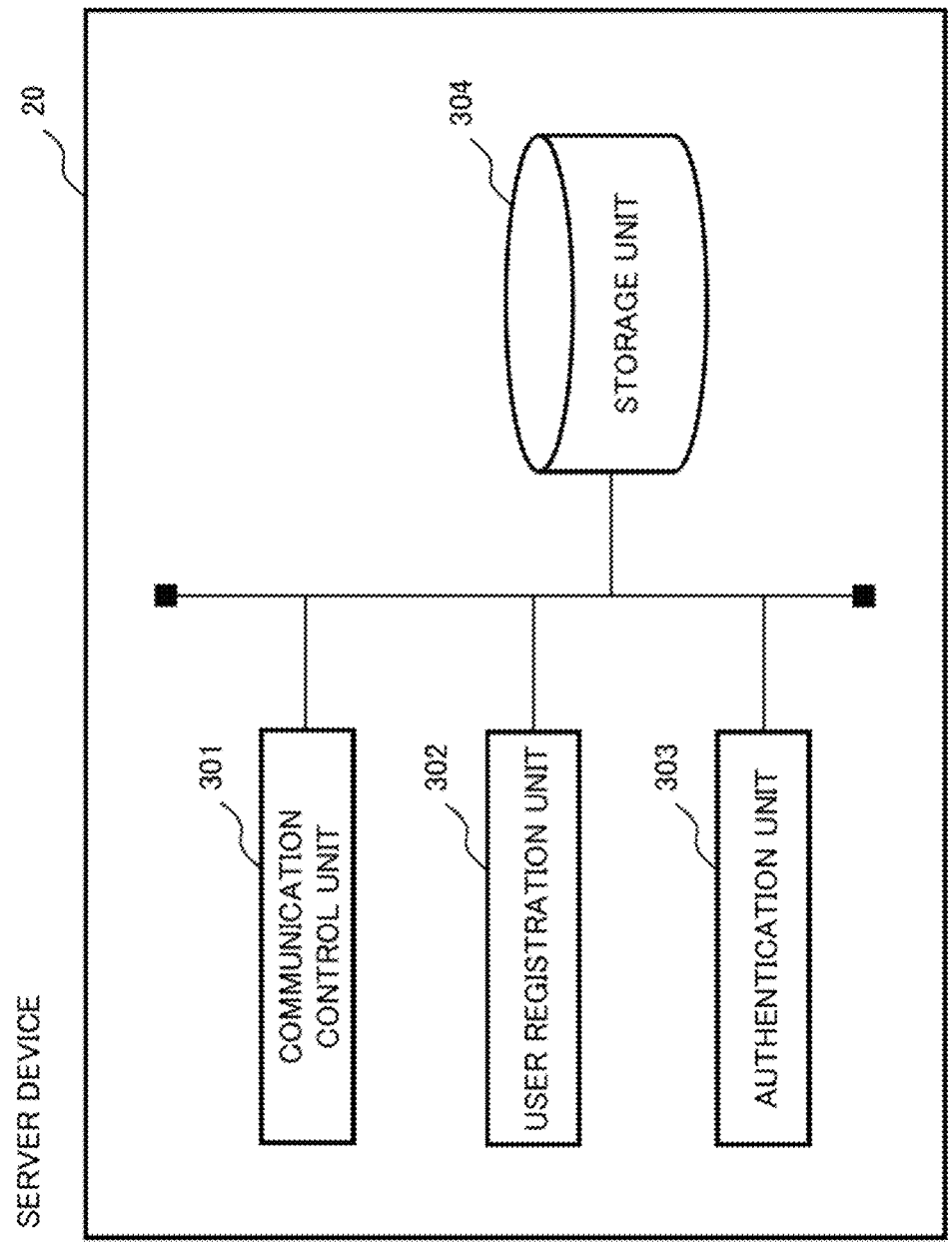
FIG. 17 is a diagram illustrating an example of a processing configuration of a server device according to the first example embodiment.

FIG. 17 is a diagram illustrating an example of a processing configuration (processing module) of the server device 20 according to the first example embodiment. Referring to FIG. 17, the server device 20 includes a communication control unit 301, a user registration unit 302, an authentication unit 303, and a storage unit 304.

The communication control unit 301 is a unit that controls communication with other devices. Specifically, the communication control unit 301 receives data (packet) from the gate device 10. Further, the communication control unit 301 transmits data to the gate device 10. The communication control unit 301 delivers data received from another device to another processing module. The communication control unit 301 transmits data acquired from another processing module to another device. In this manner, the other processing modules transmit and receive data to and from other devices via the communication control unit 301.

The user registration unit 302 is a unit that performs system registration of a user (system user) who can pass through the gate device 10. The user registration unit 302 acquires biometric information (for example, a face image) and personal information (for example, the name) of a user who can pass through the gate device 10 using an arbitrary means.

For example, in a case where the gate device 10 is a device installed at an airport, the system user inputs biometric information and personal information (name, passport number, etc.) to the server device 20 using a web page of an airline company or a kiosk terminal installed at the airport. Alternatively, in a case where the gate device 10 is a device installed at a ticket gate of a station, the system user inputs biometric information, personal information, and the like to the server device 20 from a web page of a railway company or the like or a terminal installed at a station.

When acquiring a face image, the user registration unit 302 calculates a feature amount from the face image. The user registration unit 302 registers the biometric information (for example, the feature amount calculated from the face image) of the system user in the "user database". The user registration unit 302 registers a user identifier (ID) for identifying the system user, personal information (for example, name, nationality, gender, and the like), and biometric information in the user database in association with each other as necessary (see FIG. 18). The user database illustrated in FIG. 18 is an example, and other items may be stored in association with the biometric information (feature amount). For example, a "face image" may be registered in the user database.

The authentication unit 303 is a unit that processes the authentication request received from the gate device 10. Specifically, the authentication unit 303 sets the biometric information (feature amount) included in the authentication request as the collation target, and performs the collation processing with the biometric information registered in the user database.

More specifically, the authentication unit 303 sets the feature amount extracted from the authentication request as the collation target, and executes one-to-N(N is a positive integer, and the same applies hereinafter) collation with the plurality of feature amounts registered in the user database.

The authentication unit 303 calculates similarity between the feature amount (feature vector) of the collation target and each of the plurality of feature amounts on the registration side. The authentication unit 303 sets "authentication success" if the feature amount of which the similarity is equal to or greater than the predetermined value is registered in the user database. The authentication unit 303 sets "authentication failure" if the feature amount of which the similarity is equal to or greater than the predetermined value is not registered in the user database.

In addition, the authentication unit 303 specifies a feature amount of which the similarity with the feature amount of the collation target is equal to or greater than a predetermined value and of which the similarity is the highest among the plurality of feature amounts registered in the user database. The authentication unit 303 transmits the user ID and the personal information related to the specified feature amount to another module and the gate device 10 as necessary. For example, in a case where the gate device 10 is a device installed in an airport, the progress (check passage, security check passage, etc.) of the procedure is managed using the information (name, passport number, etc.) specified by the authentication unit 303. For example, in a case where gate device 10 is a device installed at a ticket gate of a station, fare adjustment processing or the like is performed using the specified information.

The storage unit 304 stores various types of information necessary for the operation of the server device 20. In the storage unit 304, a user database is constructed.

Figure 19:
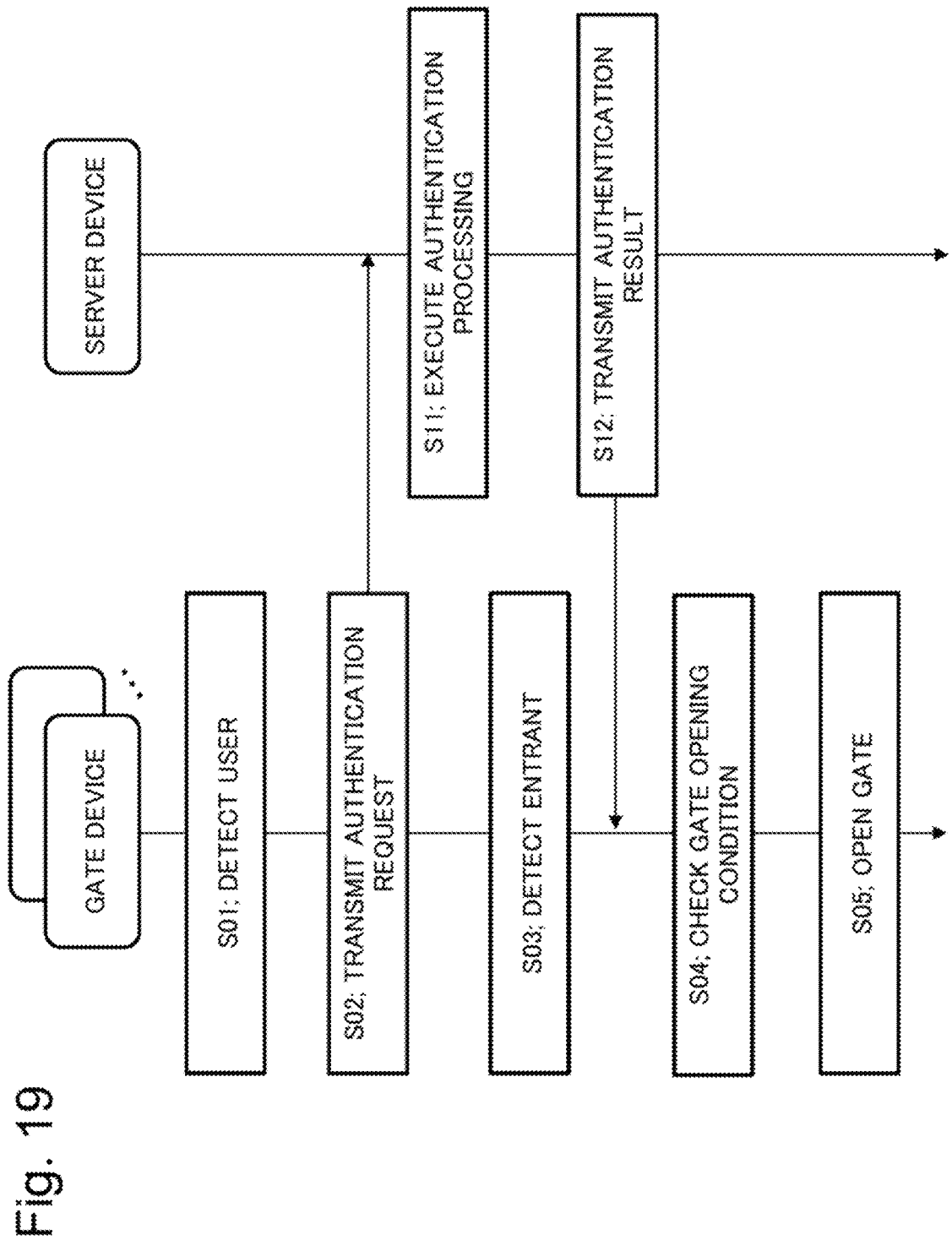
FIG. 19 is a sequence diagram illustrating an example of an operation of the authentication system according to the first example embodiment.

FIG. 19 is a sequence diagram illustrating an example of the operation of the authentication system according to the first example embodiment. It is assumed that the system user is registered in advance prior to the operation of FIG. 19.

The gate device 10 detects the user located in the authentication area (Step S01). Note that the gate device 10 may take a measure such that the user can recognize that the authentication processing is being executed when the authentication target person is detected. For example, the gate device 10 may display the face image of the authentication target person on the displays 13 and 14. Alternatively, the gate device 10 may display, on displays 13 and 14, a message or a symbol (for example, an arrow or the like) prompting the user to enter the internal area of the gate device 10 from the authentication area.

The gate device 10 acquires the biometric information of the authentication target person (the user located in the authentication area), and transmits an authentication request including the biometric information to the server device 20 (Step S02).

The server device 20 executes authentication processing using the biometric information included in the authentication request and the biometric information registered in the user database (Step S11).

The server device 20 transmits the authentication result (authentication success, authentication failure) to the gate device 10 (Step S12).

The gate device 10 determines whether the authentication target person enters in parallel with the authentication processing of the server device 20 (detection of the entrant; Step S03).

The gate device 10 checks whether a condition for opening the gate 17 (gate opening condition) is satisfied (Step S04). Specifically, the gate device 10 confirms whether the authentication succeeds and whether the entrant and the authentication target person are the same person.

When the gate opening condition is satisfied, the gate device 10 opens the gate 17 (Step S05).

As described above, the authentication system according to the first example embodiment specifies the authentication target person in a case where a plurality of persons (candidates of system user and authentication target person) is captured in images obtained from two cameras (upper camera 12-1 and lower camera 12-2). At that time, the gate device 10 calculates the distance between each user and the camera installation surface using the parallax of the object (the user commonly appearing in the two images) in the two images. The gate device 10 specifies a user closest to the own device based on the calculated distance, and sets the specified user as an authentication target person. As described above, in the first example embodiment, the user in the foremost row is specified regardless of the size of the face area having a large individual difference, so that the user to be authenticated can be accurately determined.

Second Example Embodiment

Next, a second example embodiment will be described in detail with reference to the drawings.

In the first example embodiment, the distance between the common region of the upper image and the lower image and the camera installation surface is calculated, and the anteroposterior relationship of the user is determined based on the calculated distance. In the second example embodiment, a case where the anteroposterior relationship is determined on the basis of the positional relationship of the user appearing in the image will be described.

Since the configuration of the authentication system according to the second example embodiment can be the same as that of the first example embodiment, the description related to FIG. 2 is omitted. In addition, since the processing configurations of the gate device 10 and the server device 20 according to the second example embodiment can be the same as those of the first example embodiment, the description thereof will be omitted.

In the first example embodiment, the case where the user is imaged using the two cameras has been described. However, in the second example embodiment, it is sufficient that the image of the user can be capture using at least one or more cameras. For example, in a case where a user with a high height and a short height can be imaged by one camera, two cameras are unnecessary. Alternatively, the two cameras are unnecessary even in a case where authentication regarding a user with a high height and a short height is unnecessary or an error is allowed at the time of authentication. It is a matter of course that the gate device 10 according to the second example embodiment may include two cameras. In the following description, a case where the gate device 10 according to the second example embodiment includes two cameras will be described.

Hereinafter, differences between the first and second example embodiments will be mainly described.

As described above, the face authentication module 11 is installed to be inclined at a predetermined angle with respect to the traveling direction of the user. For example, the face authentication module 11 is installed at 45 degrees ($\theta$ illustrated in FIG. 4 is 45 degrees).

Since the face authentication module 11 is installed to be inclined with respect to the traveling direction of the user, the position where the user appears in the image changes according to the position of the user (distance between the user and the gate device 10). Specifically, in a case where the user is present far away, the user appears on the side where the face authentication module 11 of the gate device 10 is installed (the left direction in the example of FIG. 4). Thereafter, when the user approaches the gate device 10, the position of the user (the position of the user shown in the image) moves on the right side (in the rightward direction; the X coordinate in a case where the lower left of the image is set as the origin moves in the positive direction).

Figure 20A:
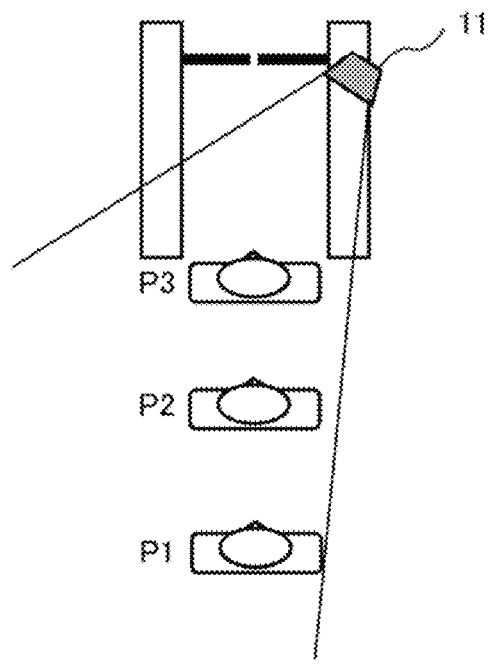
FIG. 20 is a diagram for explaining the relationship between the actual position of a user and the position of the user appearing in the image.
Figure 20B:
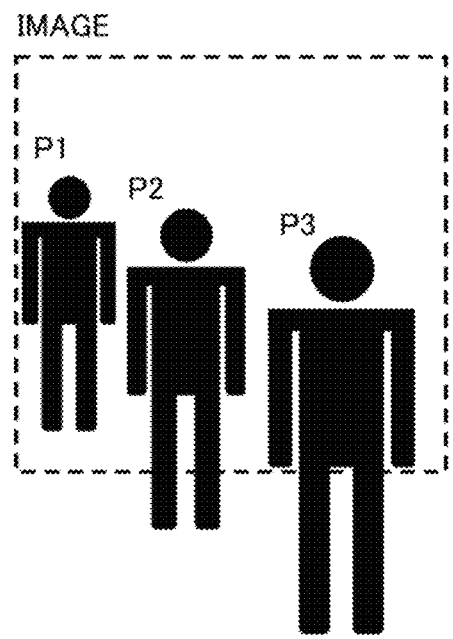

For example, as illustrated in FIG. 20A, a case where the user moves to positions P1, P2, and P3 is considered. In this case, the position of the user in the captured image moves from left to right as illustrated in FIG. 20B. This fact indicates that the user appeared on the right side of the image is close to the gate device 10. In other words, in a case where a plurality of users appears in the same image, it indicates that the user located on the right side of the image is closer to the gate device 10 than the user located on the left side. The gate device 10 according to the second example embodiment specifies the anteroposterior relationship among the plurality of users using the fact.

The authentication target setting unit 204 of the gate device 10 according to the second example embodiment is different from that of the first example embodiment in the processing of Step S112 illustrated in FIG. 7. In a case where a plurality of users appears in the image, the authentication target setting unit 204 specifies the user in the foremost row among the plurality of users according to the position of each of the plurality of users in the image. The authentication target setting unit 204 sets the specified user as an authentication target person.

Figure 21:
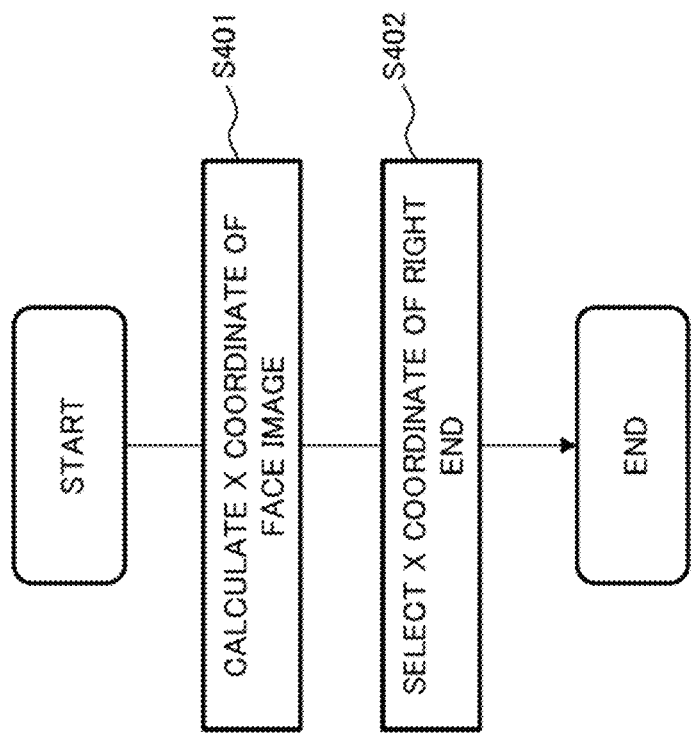
FIG. 21 is a flowchart illustrating an example of an operation of an authentication target setting unit according to a second example embodiment.

FIG. 21 is a flowchart illustrating an example of the operation of the authentication target setting unit 204 according to the second example embodiment. With reference to FIG. 21, the anteroposterior relationship specifying processing of the authentication target setting unit will be described.

The authentication target setting unit 204 calculates X coordinates (coordinates in the horizontal direction) of each face image included in the image (Step S401). Note that the calculation of the X coordinates may be performed using any one of the upper image and the lower image.

The authentication target setting unit 204 selects the X coordinate of the right end (Step S402). The face image related to the selected X coordinate is to be authenticated.

The authentication target setting unit 204 may apply a predetermined condition to a target for specifying the anteroposterior relationship to a plurality of users (face images) included in the image. The authentication target setting unit 204 may set a face image satisfying a predetermined condition as the identification target of the anteroposterior relationship. Specifically, the authentication target setting unit 204 may exclude a user whose interocular distance is smaller than a predetermined value (for example, 60 pixels) from the determination related to the user in the foremost row among the plurality of users. By setting such a condition, it is possible to exclude a user who appears at the right end of the image while being located far from the gate device 10.

Note that, in the gate device 10 illustrated in FIGS. 3 and 4, since the face authentication module 11 is installed on the right side with respect to the traveling direction of the user, the user appearing at the right end of the image is set as the authentication target person. In a case where the face authentication module 11 is installed on the left side with respect to the traveling direction of the user, the user appearing at the left end of the image is set as the authentication target person.

As described above, the gate device 10 according to the second example embodiment specifies the user located at the end on the side determined according to the traveling direction of the user and the installation position of the camera as the user in the foremost row. As a result, similarly to the first example embodiment, the gate device 10 can accurately determine the user of the authentication target.

Figure 22:
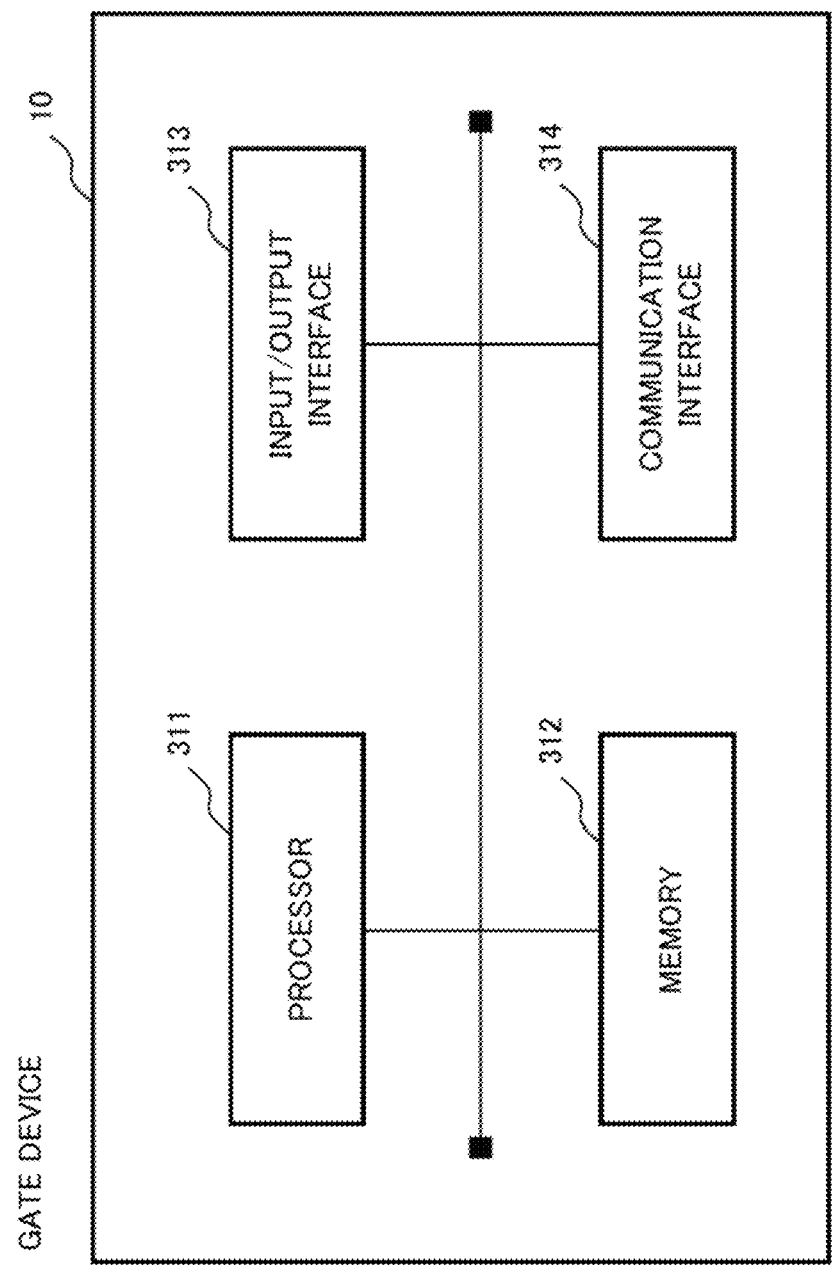
FIG. 22 is a diagram illustrating an example of a hardware configuration of the gate device.

Next, hardware of each device constituting the authentication system will be described. FIG. 22 is a diagram illustrating an example of a hardware configuration of the gate device 10. Note that, since the face authentication module 11, the camera 12, and the like have already been described, these elements are not illustrated in FIG. 22.

The gate device 10 includes a processor 311, a memory 312, an input/output interface 313, a communication interface 314, and the like. The components such as the processor 311 are connected by an internal bus or the like and are configured to be able to communicate with each other.

However, the configuration illustrated in FIG. 22 is not intended to limit the hardware configuration of the gate device 10. The gate device 10 may include hardware (not illustrated) or may not include the input/output interface 313 as necessary. In addition, the number of processors 311 and the like included in the gate device 10 is not limited to the example of FIG. 22, and for example, a plurality of processors 311 may be included in the gate device 10.

The processor 311 is a programmable device such as a central processing unit (CPU), a micro processing unit (MPU), or a digital signal processor (DSP). Alternatively, the processor 311 may be a device such as a field programmable gate array (FPGA) or an application specific integrated circuit (ASIC). The processor 311 is configured to execute various programs including an operating system (OS).

The memory 312 is a random access memory (RAM), a read only memory (ROM), a hard disk drive (HDD), a solid state drive (SSD), or the like. The memory 312 stores an OS program, an application program, and various data.

The input/output interface 313 is an interface of a display device or an input device (not illustrated). The display device may be the display 14. The input device may be a touch panel integrated with the display 14.

The communication interface 314 is a circuit, a module, or the like that communicates with another device. For example, the communication interface 314 includes a network interface card (NIC) or the like.

The functions of the gate device 10 are implemented by various processing modules. The processing module is implemented, for example, by the processor 311 executing a program stored in the memory 312. In addition, the program can be recorded in a computer-readable storage medium. The storage medium may be a non-transient (non-transitory) medium such as a semiconductor memory, a hard disk, a magnetic recording medium, or an optical recording medium. That is, the present disclosure can also be embodied as a computer program product. In addition, the program can be downloaded via a network or updated using a storage medium storing the program. Further, the processing module may be achieved by a semiconductor chip.

The server device 20 can be configured similarly to the gate device 10, and a basic hardware configuration of the server device is not different from that of the gate device 10. Therefore, the description is omitted.

The gate device 10 is equipped with a computer, and can achieve the function of the gate device 10 by causing the computer to execute a program. The gate device 10 executes the "gate device control method" by the program.

Modified Example

Note that the configuration, operation, and the like of the authentication system described in the above example embodiments are merely examples, and are not intended to limit the configuration and the like of the system.

The application destination of the gate device 10 of the present disclosure is not particularly limited. For example, "airport" is exemplified as an application destination (installation place) of the gate device 10 of the present disclosure. Specifically, the gate device 10 may be used as a part of an apparatus responsible for an examination system using biometric authentication performed at an airport. In the examination system, identity confirmation (confirmation as to whether the photographed face image matches the face image described in the passport) is performed at the time of check-in, and face data (face image or feature amount), flight information, and passport information are stored in association with each other. When the identity confirmation is completed, a token for performing examination in biometric authentication is generated. The gate device 10 of the present disclosure is installed in various examination areas (for example, the security inspection site) in an airport, and the gate device 10 authenticates a user by collating a face image registered at the time of check-in with a face image captured by the own device.

In the above example embodiments, the case of detecting an entrant using the in-gate sensor 16 has been described. However, when it is difficult for a user different from the authentication target person to enter the gate device 10, the detection of the entrant is unnecessary. For example, by configuring the length of the main body of the gate device 10 in the traveling direction of the person passing through the gate to be long and setting the authentication area inside gate device 10, it is difficult for a user different from the authentication target person to enter the inside of the gate device 10.

In the above example embodiments, the gate device 10 including the two cameras (upper camera 12-1 and lower camera 12-2) has been described. However, the gate device 10 may include one camera. In this case, one camera may be configured to be movable up and down, and the gate device 10 may acquire two images (upper image, lower image) by changing a position of the camera.

In the above example embodiments, the case where the user is imaged by the two cameras (upper camera 12-1 and lower camera 12-2), and the authentication target person (the user in the foremost row) is specified using the parallax obtained from the two images has been described. However, the number of cameras is not limited to two, and the authentication target person may be specified using three or more cameras. For example, a middle camera is installed between the upper camera 12-1 and the lower camera 12-2. The gate device 10 can determine the anteroposterior relationship between the users appearing in the upper camera 12-1 and the middle camera and the anteroposterior relationship between the users appearing in the middle camera and the lower camera 12-2.

In the above example embodiments, the description has been made on the assumption that the performance of the upper camera 12-1 and the lower camera 12-2 is substantially the same. However, the performance of these cameras may be different. In this case, the gate device 10 may take measures to fill the performance difference between the two cameras. For example, the gate device 10 may convert the size or the like of one of the obtained two images. That is, the gate device of the disclosure of the present application can be achieved even in a case where the selection of the camera that can be used is widened by the measures such as the conversion processing, and the installation place and the like of the camera in the face authentication module 11 are limited.

In the above example embodiments, the case where the biometric information related to the feature amount generated from the face image is transmitted from the gate device 10 to the server device 20 has been described. However, the "face image" itself may be transmitted as the biometric information from the gate device 10 to the server device 20. The server device 20 may generate a feature amount from the acquired face image and execute authentication processing (one-to-N collation). Even when the face image itself is transmitted to the server device 20, the gate device 10 determines the identity between the authentication target person and the entrant using the feature amount generated from the face image.

In the above example embodiments, the determination on the identity between the authentication target person and the entrant is executed by the gate device 10, but the determination may be executed by the server device 20. In this case, the gate device 10 acquires biometric information of an entrant into the internal area, and transmits the biometric information to the server device 20. The server device 20 may collate the biometric information included in the authentication request with the biometric information of the entrant to determine the identity between the authentication target person and the entrant.

In the above example embodiments, a so-called client server system has been described in which the gate device 10 transmits the authentication request to the server device 20, and the server device 20 processes the request. However, the authentication processing executed by the server device 20 may be executed by the gate device 10. That is, some or all of the functions of server device 20 may be implemented by the gate device 10.

In the above example embodiments, it has been described that an error is set in a case where the face image is distributed in either the upper image or the lower image and the image includes a plurality of face images (Step S105 in FIG. 7). In this case, when the upper image includes a plurality of face images, the gate device 10 may determine the anteroposterior relationship using the parallax between the two images and the position of the user. For example, in the case of Fig. 9A, the anteroposterior relationship may be determined using an object (torso, legs, or the like of the user) that appears in common in the upper image and the lower image. Alternatively, as described in the second example embodiment, the gate device 10 may determine the anteroposterior relationship according to the position of the face image included in the upper image.

In addition, in the case illustrated in FIG. 9B, since there is no object (user) that appears in common in the upper image and the lower image, it is not possible to determine the anteroposterior relationship using parallax. Therefore, when the face image is present only in the lower image, the gate device 10 may determine the anteroposterior relationship of the user according to the position of the user in the image (lower image).

Alternatively, by combining the first and second example embodiments, an authentication target person may be selected using parallax in the case illustrated in FIGS. 8(a) and 9(a), and an authentication target person may be selected according to the position of the image in the case illustrated in FIG. 9(b).

The gate device 10 may change the control of the LED for dimming according to the purpose of the image (face image; biometric information) to be acquired. For example, the gate device 10 may change the light intensity between the case of imaging the user located in the authentication area and the case of imaging the entrant into the own device.

A plurality of gate devices 10 may operate in conjunction with each other or in cooperation with each other. Specifically, the server device 20 may transmit a response to the authentication request acquired from one gate device 10 to another gate device 10. For example, in the example of FIG. 2, the authentication result for the authentication request acquired from the gate device 10-1 may be transmitted to each of the gate devices 10-1 to 10-3. In this case, even if the authentication target person detected by the gate device 10-1 moves toward the gate device 10-2 (even if the authentication target person enters the gate device 10-2), the authentication target person can pass through the gate device 10-2. In this case, the biometric information of the authentication target person generated by the gate device 10-1 is transmitted from the gate device 10-1 to the other gate devices 10-2 and 10-3. Alternatively, the biometric information of the authentication target person may be transmitted from the server device 20 to the other gate devices 10-2 and 10-3.

The gate device 10 may be installed in a limited space of an existing facility, for example. In this case, the length of the main body of the gate device 10 in the traveling direction of the person who passes through the gate device 10 can be about 1.5 meters, which is shorter than 2 to 3 meters, which is the length of a general face authentication gate, and the distance to the gate 17 can be, for example, 96 centimeters (corresponding to one and a half steps of the stride of an adult male). When the length of the main body of the gate device 10 is about 1.5 meters, the length of the authentication area in the traveling direction is preferably about 30 cm to 60 cm.

A form of data transmission and reception between the gate device 10 and the server device 20 is not particularly limited, but data transmitted and received between these devices may be encrypted. The face image and the feature amount calculated from the face image are personal information, and in order to appropriately protect the personal information, it is desirable that encrypted data be transmitted and received.

In the flowchart (Sequence Diagram) used in the above description, a plurality of steps (processes) is described in order, but the execution order of the steps executed in the example embodiments is not limited to the described order. In the example embodiments, for example, the order of the illustrated steps can be changed within a range in which there is no problem in terms of content, such as executing each process in parallel.

The above example embodiments have been described in detail in order to facilitate understanding of the present disclosure, and it is not intended that all the configurations described above are necessary. In addition, in a case where a plurality of example embodiments has been described, the example embodiments may be used alone or in combination. For example, a part of the configuration of the example embodiment can be replaced with the configuration of another example embodiment, or the configuration of another example embodiment can be added to the configuration of the example embodiment. Further, it is possible to add, delete, and replace other configurations for a part of the configuration of the example embodiment.

Although the industrial applicability of the present disclosure is apparent from the above description, the present disclosure can be suitably applied to an authentication system installed in an airport, a station, or the like.

Some or all of the above example embodiments may be described as the following supplementary notes, but are not limited to the following.

[Supplementary Note 1]

A gate device including:

an acquisition unit configured to acquire an image from a camera;

a setting unit configured, in a case where a plurality of users appears in the acquired image, to specify a user in a foremost row among the plurality of users according to a position of each of the plurality of users in the image, and set the specified user as an authentication target person; and a gate control unit configured to control a gate based on an authentication result of the authentication target person.

[Supplementary Note 2]

The gate device according to Supplementary Note 1, in which the camera is installed at a predetermined angle with respect to a traveling direction of the user.

[Supplementary Note 3]

The gate device according to Supplementary Note 1 or 2, in which the setting unit specifies a user located at an end on a side determined according to the traveling direction of the user and an installation position of the camera as the user in the foremost row.

[Supplementary Note 4]

The gate device according to any one of Supplementary Notes 1 to 3, in which the setting unit excludes a user whose interocular distance is smaller than a predetermined value from the determination related to the user in the foremost row among the plurality of users.

[Supplementary Note 5]

The gate device according to any one of Supplementary Notes 1 to 4, in which in a case where the camera is installed on a right side with respect to the traveling direction of the user, the setting unit specifies a user appearing at a right end of the image as the user in the foremost row.

[Supplementary Note 6]

The gate device according to any one of Supplementary Notes 1 to 4, in which in a case where the camera is installed on a left side with respect to the traveling direction of the user, the setting unit specifies a user appearing at a left end of the image as the user in the foremost row.

[Supplementary Note 7]

The gate device according to any one of Supplementary Notes 1 to 6, further including an authentication request unit configured to transmit an authentication request including biometric information of the authentication target person to a server device.

[Supplementary Note 8]

The gate device according to Supplementary Note 7, in which the authentication request unit transmits the authentication request including a feature amount generated from a face image of the authentication target person to the server device.

[Supplementary Note 9]

An authentication system including:

a server device configured to store biometric information of each of a plurality of system users and execute authentication processing using the plurality of pieces of biometric information; and a gate device connected to the server device, in which the gate device includes:

an acquisition unit configured to acquire an image from a camera;

a setting unit that configured, in a case where a plurality of users appears in the acquired image, to specify a user in a foremost row among the plurality of users according to a position of each of the plurality of users in the image, and set the specified user as an authentication target person;

an authentication request unit configured to request a server device to authenticate the authentication target person; and a gate control unit configured to control a gate based on an authentication result of the authentication target person.

[Supplementary Note 10]

The authentication system according to Supplementary Note 9, in which the authentication request unit transmits an authentication request including biometric information of the authentication target person to the server device, and the server device authenticates the authentication target person using the biometric information acquired from the authentication request and the biometric information of the plurality of system users.

[Supplementary Note 11]

A gate device control method including:

in a gate device, acquiring an image from a camera;

in a case where a plurality of users appears in the acquired image, specifying a user in a foremost row among the plurality of users according to a position of each of the plurality of users in the image, and setting the specified user as an authentication target person; and controlling a gate based on an authentication result of the authentication target person.

[Supplementary Note 12]

A computer-readable storage medium storing a program for causing a computer mounted in a gate device to execute:

acquiring an image from a camera;

in a case where a plurality of users appears in the acquired image, specifying a user in a foremost row among the plurality of users according to a position of each of the plurality of users in the image, and setting the specified user as an authentication target person; and controlling a gate based on an authentication result of the authentication target person.

The disclosures of the cited prior art documents are incorporated herein by reference. While the example embodiments of the present disclosure have been particularly shown and described above, the present disclosure is not limited to these example embodiments. It will be understood by those skilled in the art that these example embodiments are exemplary only and that various modifications may be made without departing from the scope and spirit of the present disclosure as defined by the claims. That is, it goes without saying that the present disclosure includes various modifications and corrections that can be made by those skilled in the art in accordance with the entire disclosure including the claims and the technical idea.

REFERENCE SIGNS LIST 10, 10-1 to 10-3, 100 gate device
11 face authentication module
12-1 upper camera
12-2 lower camera
13 display
14 display
15 area sensor
16 in-gate sensor
17 gate
20 server device
101 acquisition unit
102 setting unit
103, 207 gate control unit
201, 301 communication control unit
202 user detection unit
203 biometric information acquisition unit
204 authentication target setting unit
205 authentication request unit
206 entrant determination unit
208 message output unit
209, 304 storage unit
302 user registration unit
303 authentication unit
311 processor
312 memory
313 input/output interface
314 communication interface

What is claimed is:

1. A gate device comprising:

a memory storing instructions; and at least one processor configured to execute the instructions to perform:

acquiring a first image from a first camera and a second image from a second camera, the first image and the second image having a common region;

in a case where heads of a plurality of users simultaneously appear in the common region of the first image and the second image, specifying a user in a foremost row among the plurality of users according to a position of each of the plurality of users in the common region of the first image and the second image, and setting the specified user as an authentication target person;

controlling a gate based on an authentication result of the authentication target person; and in a case where the plurality of users appear in only the first image or in only the second image, setting an error result, wherein the specified user is set as the authentication target person by:

setting a distance measurement band in the common region;

dividing the distance measurement band into a plurality of areas;

calculating, for each area, a distance to a camera installation surface of the first and second cameras, using a stereo method;

specifying a position where each of a plurality of distance peaks appears, a number of the plurality of distance peaks corresponding to a number of the plurality of users; and specifying, as the user in the foremost row, a user corresponding to a position where a minimum distance peak appears.

2. The gate device according to claim 1, wherein the first camera and the second camera are each installed at a predetermined angle with respect to a traveling direction of the plurality of users.

3. The gate device according to claim 1, wherein the at least one processor is configured to execute the instructions to perform:

specifying the user in the foremost row from the plurality of users located at an end on a side determined according to a traveling direction of the plurality of users and an installation position of the first camera and the second camera.

4. The gate device according to claim 1, wherein the at least one processor is configured to execute the instructions to\perform:

excluding any user having an interocular distance smaller than a predetermined value from being specified as the user in the foremost row.

5. The gate device according to claim 1, wherein the at least one processor is configured to execute the instructions to further perform:

in a case where the first camera and the second camera are installed on a right side with respect to a traveling direction of the plurality of users, specifying the user in the foremost row from the plurality of users appearing at a right end of the common region of the first image and the second image.

6. The gate device according to claim 1, wherein
the at least one processor is configured to execute the instructions to perform:
in a case where the first camera and the second camera are installed on a left side with respect to a traveling direction of the plurality of users, specifying the user in the foremost row from the plurality of users appearing at a left end of the common region of the first image and the second image.

7. The gate device according to claim 1, wherein
the at least one processor is further configured to execute the instructions to perform:
transmitting an authentication request including biometric information of the authentication target person to a server device.

8. The gate device according to claim 7, wherein
the at least one processor is configured to execute the instructions to perform:
transmitting the authentication request including a feature amount generated from a face image of the authentication target person to the server device.

9. A gate device control method performed by a gate device and comprising:
acquiring a first image from a first camera and a second image from a second camera, the first image and the second image having a common region;
in a case where heads of a plurality of users simultaneously appear in the common region of the first image and the second image, specifying a user in a foremost row among the plurality of users according to a position of each of the plurality of users in the common region of the first image and the second image, and setting the specified user as an authentication target person;
controlling a gate based on an authentication result of the authentication target person; and
in a case where the plurality of users appear in only the first image or in only the second image, setting an error result, wherein
the specified user is set as the authentication target person by:
setting a distance measurement band in the common region;
dividing the distance measurement band into a plurality of areas;
calculating, for each area, a distance to a camera installation surface of the first and second cameras, using a stereo method;
specifying a position where each of a plurality of distance peaks appears, a number of the plurality of distance peaks corresponding to a number of the plurality of users; and
specifying, as the user in the foremost row, a user corresponding to a position where a minimum distance peak appears.

10. A non-transitory_computer-readable storage medium storing a program for causing a computer mounted in a gate device to execute:
acquiring a first image from a first camera and a second image from a second camera, the first image and the second image having a common region;
in a case where heads of a plurality of users simultaneously appear in the common region of the first image and the second image, specifying a user in a foremost row among the plurality of users according to a position of each of the plurality of users in the common region of the first image and the second image, and setting the specified user as an authentication target person;
controlling a gate based on an authentication result of the authentication target person; and
in a case where the plurality of users appear in only the first image or in only the second image, setting an error result, wherein
the specified user is set as the authentication target person by;
setting a distance measurement band in the common region;
dividing the distance measurement band into a plurality of areas;
calculating, for each area, a distance to a camera installation surface of the first and second cameras, using a stereo method;
specifying a position where each of a plurality of distance peaks appears, a number of the plurality of distance peaks corresponding to a number of the plurality of users; and
specifying, as the user in the foremost row, a user corresponding to a position where a minimum distance peak appears.

* * * * *